(12) United States Patent
Molnar et al.

(10) Patent No.: US 9,679,144 B2
(45) Date of Patent: Jun. 13, 2017

(54) PROTECTING PRIVACY IN WEB-BASED IMMERSIVE AUGMENTED REALITY

(71) Applicant: Microsoft Corporation, Redmond, WA (US)

(72) Inventors: David Molnar, Seattle, WA (US); John Vilk, Amherst, MA (US); Eyal Ofek, Redmond, WA (US); Alexander Moshchuk, Kirkland, WA (US); Jiahe Wang, Rddmond, WA (US); Ran Gal, Redmond, WA (US); Lior Shapira, Redmond, WA (US); Douglas Christopher Burger, Bellevue, WA (US); Blair MacIntyre, Atlanta, GA (US); Benjamin Livshits, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 137 days.

(21) Appl. No.: 14/082,051

(22) Filed: Nov. 15, 2013

(65) Prior Publication Data
US 2015/0143459 A1   May 21, 2015

(51) Int. Cl.
G06F 7/04 (2006.01)
G06F 17/30 (2006.01)
(Continued)

(52) U.S. Cl.
CPC .......... *G06F 21/60* (2013.01); *G06F 21/629* (2013.01); *G06F 21/6245* (2013.01);
(Continued)

(58) Field of Classification Search
CPC ...................................................... G06F 21/60
(Continued)

(56) References Cited

U.S. PATENT DOCUMENTS 6,236,398 B1 * 5/2001 Kojima et al. ................. 345/419
7,583,275 B2 * 9/2009 Neumann et al. ............ 345/633
(Continued)

OTHER PUBLICATIONS

Hill, et al., "Kharma: A KML/HTML architecture for mobile augmented reality applications." In Proceedings of IEEE International Symposium on Mixed and Augmented Reality, (ISMAR10), Oct. 13, 2010.
(Continued)

*Primary Examiner* — Dant Shaifer Harriman
(74) *Attorney, Agent, or Firm* — Lyon & Harr, LLP; Mark A. Watson

(57) ABSTRACT

An "AR Privacy API" provides an API that allows applications and web browsers to use various content rendering abstractions to protect user privacy in a wide range of web-based immersive augmented reality (AR) scenarios. The AR Privacy API extends the traditional concept of "web pages" to immersive "web rooms" wherein any desired combination of existing or new 2D and 3D content is rendered within a user's room or other space. Advantageously, the AR Privacy API and associated rendering abstractions are useable by a wide variety of applications and web content for enhancing the user's room or other space with web-based immersive AR content. Further, the AR Privacy API is implemented using any existing or new web page coding platform, including, but not limited to HTML, XML, CSS, JavaScript, etc., thereby enabling existing web content and coding techniques to be smoothly integrated into a wide range of web room AR scenarios.

20 Claims, 7 Drawing Sheets

(51) Int. Cl.
G06F 21/60 (2013.01)
G06F 21/62 (2013.01)
H04W 12/02 (2009.01)
G06T 19/00 (2011.01)
H04L 29/08 (2006.01)
H04L 29/06 (2006.01)

(52) U.S. Cl.
CPC ............ *G06T 19/006* (2013.01); *H04L 67/02* (2013.01); *H04L 67/10* (2013.01); *H04L 67/12* (2013.01); *H04L 67/38* (2013.01); *H04W 12/02* (2013.01); *H04L 67/22* (2013.01)

(58) Field of Classification Search
USPC .......................................................... 726/2
See application file for complete search history.

(56) References Cited

U.S. PATENT DOCUMENTS

| | | | |
|---|---|---|---|
| 8,260,728 B1* | 9/2012 | Walsh et al. ................. | 706/12 |
| 2008/0195956 A1* | 8/2008 | Baron et al. ................. | 715/753 |
| 2010/0121866 A1* | 5/2010 | Bell ...................... | G06F 3/0425 707/758 |
| 2012/0324565 A1* | 12/2012 | Cohen ........................... | 726/12 |
| 2012/0327116 A1* | 12/2012 | Liu et al. ..................... | 345/633 |
| 2013/0038633 A1* | 2/2013 | Maggiore .................... | 345/633 |
| 2013/0135344 A1 | 5/2013 | Stirbu et al. | |

OTHER PUBLICATIONS

Heikkinen, Ilmari, "Writing Augmented Reality Applications using JSARToolKit", Published on: Feb. 28, 2012, Available at: http://www.html5rocks.com/en/tutorials/webgl/jsartoolkit_webrtc/.
"ARToolKit", Published by ARToolworks, Inc., Retrieved on: Aug. 16, 2013, Available at: https://www.developergarden.com/nc/de/marketplace/components/details/cmp/artool-kit/.
Terraso, David, "Argon, the Augmented Reality Web Browser, Available Now on iPhone", Georgia Institute of Technology, Feb. 22, 2011.
Owano, Nancy, "Augmented Reality Browser Junaio has New Look", Phys.org, Jun. 21, 2012.
Azuma, Ronald T., "A Survey of Augmented Reality", In Presence: Teleoperators and Virtual Environments, vol. 6, Issue 4, Aug. 1997, 48 pages.
Azuma, et al., "Recent Advances in Augmented Reality", In IEEE Computer Graphics and Applications, vol. 21, Issue 6, Nov. 2001, 15 pages.
Beresford, et al., "MockDroid: Trading Privacy for Application Functionality on Smartphones", In Proceedings of the 12th Workshop on Mobile Computing Systems and Applications, Mar. 1, 2011, 6 pages.
Dwork, Cynthia, "The Differential Privacy Frontier", In Proceedings of the 6th Theory of Cryptography Conference on Theory of Cryptography, Mar. 15, 2009, 7 pages.
MacIntyre, B., et al., "Kharma—KML/HTML Augmented Reality Mobile Architecture", Retrieved on: Aug. 16, 2013, Available at: https://research.cc.gatech.edu/kharma/.
Felt, et al., "Android Permissions: User Attention, Comprehension, and Behavior", In Proceedings of the Eighth Symposium on Usable Privacy and Security, Jul. 11, 2012, 14 pages.
Hansen, et al., "Clickjacking", Published on: Dec. 9, 2008, Available at: http://www.sectheory.com/clickjacking.htm.
Hornyack, et al., "These Aren't the Droids you're Looking For: Retrofitting Android to Protect Data from Imperious Applications", In Proceedings of the 18th ACM Conference on Computer and Communications Security, Oct. 17, 2011, 12 pages.
Howell, et al., "What You See is What They Get: Protecting Users from Unwanted Use of Microphones, Cameras, and Other Sensors", In Proceedings of Web 2.0 Security and Privacy Workshop, May 20, 2010, 9 pages.
Huang, et al., "Clickjacking: Attacks and Defenses", In Proceedings of the 21st USENIX Conference on Security Symposium, Aug. 8, 2012, 16 pages.
Jana, et al., "Enabling Fine-Grained Permissions for Augmented Reality Applications with Recognizers", In Microsoft Technical Report, MSR-TR-2013-11, Feb. 2013, 16 pages.
Jones, et al., "IllumiRoom: Peripheral Projected Illusions for Interactive Experiences", In Proceedings of the SIGCHI Conference on Human Factors in Computing Systems, Apr. 27, 2013, 10 pages.
Krumm, John, "A Survey of Computational Location Privacy", In Journal of Personal and Ubiquitous Computing, vol. 13, Issue 6, Aug. 2009, 9 pages.
"Microsoft Research Face SDK Beta", Published on: May 2012, Available at: http://research.microsoft.com/en-us/projects/facesdk/.
"Microsoft Speech Platform", Published on: May 22, 2013, Available at: http://msdn.microsoft.com/en-us/library/hh361572(v=office.14).aspx.
Poh, et al., "Advancements in Non-Contact, Multiparameter Physiological Measurements Using a Webcam", In IEEE Transactions on Biomedical Engineering, vol. 58, Issue 1, Jan. 2011, 5 pages.
"Qualcomm Vuforia", Retrieved on: Aug. 16, 2013, Available at: http://www.qualcomm.com/solutions/augmented-reality.
Roesner, at al., "User-Driven Access Control: Rethinking Permission Granting in Modern Operating Systems", In Microsoft Technical Report, MSR-TR-2011-91, Aug. 2, 2011, 16 pages.
Shotton, et al., "Real-Time Human Pose Recognition in Parts from a Single Depth Image", In Proceedings of the IEEE Conference on Computer Vision and Pattern Recognition, Jun. 20, 2011, 8 pages.
Viola, et al., "Robust Real-Time Object Detection", In International Journal of Computer Vision, Feb. 2001, 30 pages.
"A Vocabulary and Associated APIs for HTML and XHTML", W3.org, Published on: Dec. 17, 2012, Available at: http://www.w3.org/TR/2012/CR-html5-20121217/editing.html.
"Media Capture and Streams", W3.org, Published on: Jul. 4, 2013, Available at: http://dev.w3.org/2011/webrtc/editor/getusermedia.html.
Jana, et al., "A Scanner Darkly: Protecting User Privacy from Perceptual Applications", In Proc. of 34th IEEE Symposium on Security and Privacy, San Francisco, CA, May 2013, pp. 349-363. IEEE Computer Society, 2013.
Forster, et al., "An Architecture Based on Constraints for Augmented Shared Workspaces", In Proceedings of XIV Brazilian Symposium on Computer Graphics and Image Processing, Oct. 2001, pp. 328-335.
"International Search Report and Written Opinion Issued in PCT Patent Application No. PCT/US2014/065355", Mailed Date: Feb. 26, 2015, 11 Pages.
"International Preliminary Report on Patentability Issued in PCT Application No. PCT/US2014/065355", Mailed Date: Feb. 24, 2016, 8 Pages.
"Second Written Opinion Issued in PCT Patent Application No. PCT/US2014/065355", Mailed Date: Oct. 27, 2015, 6 Pages.

\* cited by examiner

PROTECTING PRIVACY IN WEB-BASED IMMERSIVE AUGMENTED REALITY

BACKGROUND

Recent advances in depth mapping and object recognition have paved the way for immersive in-room augmented reality (AR) experiences. These are experiences that periodically or continuously monitor the state of a room, then show virtual objects in a user's field of vision. For example, existing hardware and applications enable scanning of an entire room to obtain a 3D model of the room geometry and objects or people within the room. Projectors mounted in the room can then display arbitrary content on various surfaces in the room. Further, voice commands, gestures, persons, faces, animals, furniture, and other objects can be recognized in real time, enabling applications to sense and respond to real-world events and objects.

As these and related capabilities become widespread, untrusted applications may have increased access to various forms of private data about the user and her surroundings. Examples of such data include room size and layout, number, size, activity, and gender of persons in the room, objects such as furniture, books, art, and visible text in the room, etc. Existing approaches to addressing privacy concerns related to exposure of such data typically take one of two different approaches.

For example one typical approach generally ignores privacy concerns and allows applications to obtain unrestricted access to raw sensor data for use in rendering content relative to the room based on that sensor data. This type of rendered content can be used in various gaming technologies, academic projects, vertically integrated augmented reality experiences, etc. Clearly one disadvantage of such applications is that users are expected to trust these applications with access to potentially sensitive data gathered by various sensors.

Another typical approach to addressing privacy concerns with respect to sensor data provides one or more application programming interfaces (API's) that gives developers and applications sharply restricted access to a subset of sensor information needed for a specific application. Such API's typically tightly control how applications render content. For example, one existing "augmented reality browser" on mobile phones includes an API that gives applications the ability to overlay textual or graphical annotations to "points of interest" visible on a display of the mobile phone. The application then decides where and how to show these annotations depending on whether the phone is pointed in the appropriate direction. For example, such applications may use a camera of the phone to image visible restaurants in the immediate vicinity of the user and then overlay a display of cuisine type, ratings, or price range onto the displayed image of the restaurants. While user privacy in such scenarios has increased protections by giving untrusted applications access only to a narrow API, each narrow API supports only a limited class of applications, and is custom tailored for each application. As a result, these types of API's tend to have limited usefulness.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of prior technologies may be noted or discussed herein, the claimed subject matter is not intended to be limited to implementations that may solve or address any or all of the disadvantages of those prior technologies.

In general, an "AR Privacy API," as described herein, provides various techniques for implementing an API that allows existing or new applications and web browsers to use various content rendering abstractions to protect user privacy with respect to a wide range of web-based immersive augmented reality (AR) scenarios. The AR Privacy API extends the traditional concept of "web pages" to immersive "web rooms" wherein any desired combination of existing or new 2D and 3D content is rendered within a user's room or other space. In other words, a web room, as discussed herein, is intended to be understood as an extension of a web page to a room or space in which the AR experience is being implemented. The AR Privacy API allows web sites to render content in a room and provide rich experiences using significantly less information than traditional AR applications that process raw sensor data.

Advantageously, the AR Privacy API and associated rendering abstractions are useable by any of a wide variety of applications, and with both new and existing web content, for enhancing the user's room or other space with web-based immersive AR content. Another advantage is that the AR Privacy API is implemented using any existing or new web page coding platform, including, but not limited to HTML, XML, CSS, JavaScript, etc., thereby enabling existing web content to be smoothly integrated into a wide range of web room AR scenarios.

The use of the various rendering abstractions described herein helps to prevent applications from directly obtaining information about a room or space and the objects or persons within that space, unless authorized by the user, thereby enhancing user privacy in a wide range of immersive AR scenarios. In general, these abstractions limit the amount of information released to applications, striking a balance between functionality and user privacy. As such, the AR Privacy API enables immersive augmented reality experiences in arbitrary rooms or spaces while limiting information exposed to applications and without sacrificing web or browser-based performance.

For example, one of the rendering abstractions used by the AR Privacy API to protect user privacy is referred to herein as a "screen abstraction." The screen abstraction exposes to an application the sizes and, optionally, the relative locations or positions of various surfaces within a room or other defined space onto which "content" (i.e., any combination of images, video, and audio) can be projected. However, in most cases, there is no need to expose the relative positions. In fact, if such position information is exposed, a malicious web site can potentially model a room by spreading a large number of screens in the room that will be attached to most or all of the surfaces in the room. Advantageously, in various embodiments, the AR Privacy API evaluates a website's specification of constraints between the arrangement of multiple screens, and then determines the "screens" in the room that will satisfy those constraints (e.g., that one screen will face another), without sending the relative positions of those screens to the website or to some server hosting the website.

Other abstractions described herein, such as "input abstractions" allow the user to interact with or provide input relative to content rendered via the screen abstraction. Note that the screen abstraction unifies projected monitors, tablets, televisions, and any other surface, object, or space onto which content can be projected in a room, and simply treats each of these as a "screen" onto which content is rendered. Further, the screen abstraction is also designed to allow applications to discover the capabilities of each "screen," such as the presence of touch events while still protecting user privacy. Further, in various embodiments, a privacy level is associated with various "screens." For example, in various embodiments, the AR Privacy API considers whether "screens" are visible to other people in the room, whether "screens" are visible from the door, "screen" display quality (e.g., size, resolution, whether they projected over colored or textured areas, etc.), and then decide which of those capabilities to use and how to use them. Advantageously, the screen abstraction enhances user privacy by operating without providing raw video, depth data, or other potentially sensitive information to applications making use of the screen abstraction.

Another rendering abstraction provided by the AR Privacy API is referred to herein as a "semantic annotation abstraction." In general, the semantic annotation abstraction allows applications to declaratively specify how content is to be adapted to the presence and location of an object (or "screen") in a room, without leaking or exposing that information to the application. In other words, the semantic annotation abstraction allows applications to place, project, or otherwise render content relative to any combination of persons, objects and surfaces in the room without revealing the presence or location of those persons, objects and surfaces to the application. Advantageously, this means that the semantic annotation abstraction enhances user privacy by operating without providing web-based applications access to information about the room or persons, objects and surfaces in the room that could be used to compromise user privacy.

In view of the above summary, it is clear that the AR Privacy API described herein provides various techniques for implementing an API that uses various content rendering abstractions to protect user privacy with respect to a wide range of web-based immersive augmented reality (AR) scenarios. In addition to the just described benefits, other advantages of the AR Privacy API will become apparent from the detailed description that follows hereinafter when taken in conjunction with the accompanying drawing figures.

BRIEF DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
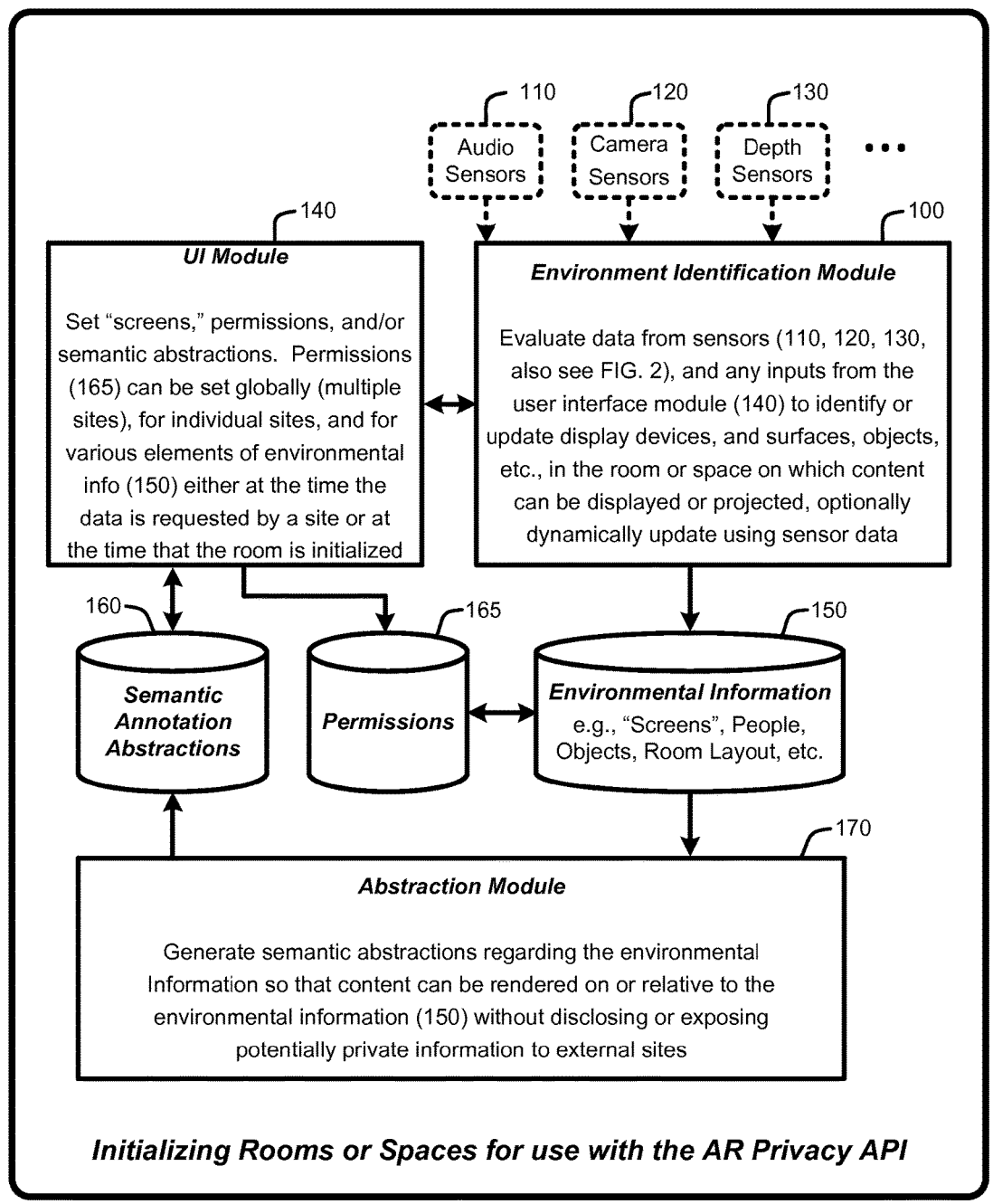
FIG. 1 provides an exemplary architectural flow diagram that illustrates program modules for use in initializing rooms or spaces for use with various embodiments of the AR Privacy API, as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction

In general, an "AR Privacy API," as described herein, provides various techniques for implementing an API that allows applications and web browsers to use various content rendering abstractions to protect user privacy in a wide range of web-based immersive augmented reality (AR) scenarios. The AR Privacy API extends the traditional concept of "web pages" to immersive "web rooms" wherein any desired combination of existing or new 2D and 3D content is rendered within a user's room or other space.

One of the rendering abstractions used by the AR Privacy API to protect user privacy is referred to herein as a "screen abstraction" that is used for rendering in immersive in-room augmented reality environments. This screen abstraction obtains the relative locations, orientation, and resolution of surfaces (e.g., monitors, tablets, televisions, and any other surface, object, or space) in a room onto which content (i.e., any combination of images, video, and audio) can be projected or otherwise displayed. Each of these surfaces is collectively referred to herein as a "screen." In addition, the screen abstraction in combination with abstractions such as an input abstraction allow applications to learn which interaction events are supported by which "screens," such as touch events for tablets, or mouse and keyboard for desktop screens. Advantageously, the screen abstraction enhances user privacy by operating without providing raw video, depth data, or other potentially sensitive information to applications making use of the screen abstraction.

Another of these rendering abstractions is referred to herein as a "semantic annotation abstraction" component of the AR Privacy API. The semantic annotation abstraction (implemented via a "semantic annotation API" component of the AR Privacy API) is used for rendering content relative to an object in the room. More specifically, the semantic annotation abstraction uses semantic abstractions to place, project, or otherwise render content relative to any combination of persons, objects and surfaces in the room without revealing the presence or location of those persons, objects and surfaces to the application. Further, by using a declarative constraint-based layout scheme, semantic annotations enable applications to create AR experiences that take advantage of object recognition capabilities, yet do not leak the presence or location of objects, persons, or other sensitive information to the application.

Advantageously, the AR Privacy API allows new and existing or legacy web sites or content to be adapted to immersive web room AR scenarios. In particular, the AR Privacy API and associated rendering abstractions are useable by a wide variety of applications and web content for enhancing the user's room or other space with web-based immersive AR content. Further, the AR Privacy API is implemented using any existing or new web page coding platform, including, but not limited to HTML, XML, CSS, JavaScript, etc., thereby enabling existing web content and coding techniques to be smoothly integrated into a wide range of web room AR scenarios.

1.1 System Overview:

As noted above, the AR Privacy API provides various techniques for implementing an API that allows applications and web browsers to use various content rendering abstractions to protect user privacy in a wide range of web-based immersive augmented reality (AR) scenarios. Various processes for use in initializing room or spaces for use with the AR Privacy API are illustrated by the general system diagram of FIG. 1. In particular, the system diagram of FIG. 1 illustrates the interrelationships between program modules and sensors for use in determining various constraints that are used by the AR Privacy API to render content, as described herein. Furthermore, while the system diagram of FIG. 1 illustrates a high-level view of various embodiments of the AR Privacy API, FIG. 1 is not intended to provide an exhaustive or complete illustration of every possible embodiment of the AR Privacy API as described throughout this document.

In addition, it should be noted that any boxes and interconnections between boxes that may be represented by broken or dashed lines in FIG. 1 represent alternate embodiments of the AR Privacy API described herein, and that any or all of these alternate embodiments, as described below, may be used in combination with other alternate embodiments that are described throughout this document.

In general, as illustrated by FIG. 1, the processes enabled by the AR Privacy API begin operation by determining what resources are available in the room or space around the user, and what privacy restrictions or constraints may be associated with the various "screens," spaces, people, objects, etc., in that room or space.

More specifically, an environment identification module 100 evaluates data from various sensors (e.g., sensors 110, 120, 130, also see FIG. 2), and any inputs from a user interface module 140 to identify or update display devices, and surfaces, objects, etc., in the room or space onto which content can be displayed or projected. The environment identification module 100 is also to identify or determine additional information, including but not limited to position and configuration of available "screens," people or animals in the room, objects, furniture, etc. in the room, overall layout or geometry of the room or space, etc. The resulting "environmental information" 150 is then saved for use by the AR Privacy API, as described in further detail herein. In various embodiments, the environmental information 150 provided by the environment identification module 100 is optionally dynamically updated using sensor data and/or additional inputs from the user interface module 140.

An abstraction module 170 then evaluates the environmental information 150 and generates semantic annotation abstractions 160 so that the AR Privacy API can render content on or relative to the environmental information without disclosing or exposing potentially private information to external sites.

The user interface module 140 is used for a variety of purposes. For example, the user interface module 140 is used in various embodiments to define or set the availability of various "screens" and to define or set various permissions 165 (e.g., a permission state, status, flag, cookie, etc.) associated with those screens or with any of a wide range of information regarding the people, objects, layout, etc., in the room or space around the user (see discussion of permissions in Section 2.5). In various embodiments, these permissions are embodied in various semantic annotation abstractions 160 that may be set or edited via the user interface module 140.

2.0 Operational Details of the AR Privacy API

The above-described program modules are employed for implementing various embodiments of the AR Privacy API. As summarized above, the AR Privacy API provides various techniques for implementing an API that allows applications and web browsers to use various content rendering abstractions to protect user privacy in a wide range of web-based immersive augmented reality (AR) scenarios. The following sections provide a detailed discussion of the operation of various embodiments of the AR Privacy API, and of exemplary methods for implementing the program modules described in Section 1 with respect to FIG. 1. In particular, the following sections provides examples and operational details of various embodiments of the AR Privacy API, including:

- An operational overview of the AR Privacy API;
- "Web room" rendering using screen abstractions and semantic annotations;
- Using input abstractions to receive user input;
- Adaptation of the AR Privacy API to the Web Environment;
- Various privacy and security considerations;
- Exemplary architecture of the AR Privacy API;
- Exemplary implementation of the AR Privacy API; and
- Various considerations for optimization of existing web content.

2.1 Operational Overview:

As noted above, the AR Privacy API provide various content rendering abstractions for protecting user privacy in a wide range of web-based immersive AR scenarios. The AR Privacy API extends the traditional concept of "web pages" to immersive "web rooms" wherein any desired combination of existing or new 2D and 3D content is rendered within a user's room or other space.

The AR Privacy API and associated rendering abstractions are useable by a wide variety of applications and web content for enhancing the user's room or other space with web-based immersive AR content. Further, the AR Privacy API is implemented using any existing or new web page coding platform, including, but not limited to HTML, XML, CSS, JavaScript, etc., thereby enabling existing web content and coding techniques to be smoothly integrated into a wide range of web room AR scenarios.

2.2 Web Room Rendering:

In general, the rendering abstractions of the AR Privacy API provide a powerful tool for rendering any combination of 2D and 3D browser content around a room or other space to enable the concept of the aforementioned "web room." In a tested embodiment, the AR Privacy API consists of three primary rendering abstractions. However, it must be understood that more or fewer types of rendering abstractions can be used in various implementations of the AR Privacy API, and that the three primary rendering abstractions described below are detailed for purposes of explanation.

The first of these three exemplary rendering abstractions is referred to herein as a "segment abstraction." In general, the segment abstraction represents a unit of web content (e.g., complete web page, video component of a page, advertisement in a frame, web page login GUI, news story, weather display, etc.). The second rendering abstraction is the aforementioned "screen abstraction," which represents a rectangle, or any other shape, in the room on which a web page can display a segment. More specifically, these screen abstractions correspond to any surface or object onto which content can be projected or displayed, or to any display device such as a monitor, television, media device, etc. The third of these rendering abstractions is the aforementioned semantic annotation abstraction. The semantic annotation abstraction allows web pages to place segments relative to annotated content in the room. Each of these rendering abstractions is discussed in further detail in the following sections.

2.2.1 Segments:

In general, the web revolves around rectangular pieces of content called elements that web designers assemble together into a cohesive tree structure: the well-known Document Object Model (DOM) tree, which the browser displays as a web page. Many of these elements correspond to HTML container tags, which encapsulate a subtree of web page content. The AR Privacy API adds a new container tag to the traditional DOM tree by providing a container tag referred to herein as a "segment." The AR Privacy API interprets segment tags to allow designers to explode subtrees of content onto arbitrary surfaces and displays in the user's room. Exemplary syntax for implementing the segment tag is described in further detail in Section 2.4. Note that the AR Privacy API could use other existing container tags (e.g., header, div, span, etc.) to perform the same functionality. However, the use of containers having a new name (e.g., the use of "segment" tags) allows designers to quickly differentiate segments from other containers in the DOM.

Advantageously, by displaying subtrees of the DOM tree rather than creating a new DOM tree for each segment, the AR Privacy API enables web pages to function as a single unit rather than a set of separate units. This is convenient from a development standpoint, as web developers can develop web rooms in the same manner as web pages or web sites, and existing web pages or sites can be easily adapted to web rooms to implement a wide range of immersive AR scenarios.

2.2.2 Screen Abstractions:

The AR Privacy API uses screen abstractions in a way that protects user privacy while enabling web sites to display content on arbitrary surfaces around the room or other space, in addition to conventional output devices such as monitors, TVs, media players, etc. Again, each of these disparate types of displays and surfaces are unified under the "screen abstraction," with each of these entities being referred to as "screens." See Section 2.6.1 for a discussion of "screen" detection in the room or space around the user.

As noted above, the screen abstraction represents a rectangle, or any other shape, in the room on which a web page can display a segment. However, for purposes of explanation, the following discussion will generally refer to rectangular segments.

In the case of rectangular segments, a "screen" has four properties: size, orientation, location, and capabilities. The size property indicates the "screen's" height and width in pixels. Orientation specifies whether the "screen" is positioned horizontally or vertically (and optionally whether it is skewed or rotated). Note that the orientation property can be dynamic if the "screen" corresponds to a physical movable device, object or surface. The location property is the "screen's" (x,y,z) coordinates in the room, relative to a particular origin in the room. The capabilities property is a set of data that describe the type of interactions that are supported locally on the "screen" (e.g., touch, audio, etc.). Note that Section 2.3.1 provides additional discussion on screen-local input and events.

By using the AR Privacy API, the web page can assign a segment to each "screen" to display its contents in the room. When this occurs, the segment expands or shrinks to fill the "screen," taking advantage of the browser's existing capabilities for adapting content to changing viewport sizes. Note that this is dependent on the web site. It may also maintain some fixed size, and not use the entire screen. Advantageously, since the AR Privacy API does note leak such scaling information to the web site or server hosting that site, the web site or server does not know if the segment was scaled, or if there is more area in the segment that was not used in the case of fixed size "screens". In a tested embodiment, the mechanism for assigning any particular segment to any particular "screen" is exposed through JavaScript, as discussed in further detail in Section 2.4. However, it should be understood that such capabilities can be implemented in any desired coding or scripting language, and that such embodiments of the AR Privacy API are not limited to JavaScript-based implementations.

2.2.3 Semantic Annotations:

In general, the AR Privacy API allows web rooms to specify content in HTML (or other web language or script) that is to be rendered to various "screens" relative to various semantic annotations that include either or both static and dynamic labels. A trusted renderer of the AR Privacy API then shows the content specified by the web room if possible, but does not release the position or presence of labels to the web room or other application. Again, a web room, as discussed herein, is intended to be understood as an extension of a web page (e.g., rendered on a user's display device) to a room or space throughout which the AR content of the web room is being rendered.

More specifically, semantic annotations are used as labels to determine where and how to render content in the web room. Semantic annotations include both static and dynamic label types. Static labels refer to the position of fixed or stationary surfaces in the room that will be treated as "screen" by the AR Privacy API. Dynamic labels refer to moving objects or persons in the room. For example, using sensors of a device such as a Kinect® device, various dynamic labels may include, for example, the head, left hand, and right hand of a Kinect® skeleton recognized with respect to a user in the room.

In various embodiments, web rooms use declarative rendering for positioning segments. Each segment uses a semantic annotation abstraction and an optional rendering constraint that ensures the content is placed on (i.e., rendered onto) a particular type of surface (e.g., a vertical surface such as a wall, door, or other surface) and another optional constraint that the content is aligned (either or both horizontally and vertically) with one or more other segments of the web room.

The screen abstraction gives web rooms specific control over content placement, but instead protects privacy by not allowing web rooms to take advantage of object recognition capabilities (e.g., no direct access to raw camera or audio data unless authorized). More specifically, in various embodiments, the screen abstraction ensures that the web page doesn't even have access to the resulting 3D structure that is being used to position and render the images. As such, while access to the camera or audio, is not enabled unless specifically authorized, in various embodiments, the screen API but allows elements to know where they are being rendered in 3D because they specify it. This prevents web rooms hosted on arbitrary servers or cloud environments from obtaining potentially private information regarding the user or the room or space around the user into which content is being rendered by the AR Privacy API. For example, a web room that wants to display a dashboard near the user's head has no way to know which "screens" are visible to the user or near the user's head. Further, a web room that wants to show a virtual object near a recognized real world object (e.g., a travel advertisement on a surface next to a world globe) cannot detect which "screen" is closest to that real world object. As a result, the screen abstraction, by itself, does not fully address the issue of helping web rooms to use object recognition for rendering while preserving user privacy.

However, in combination with the concept of labeling particular items or locations in the room provided by the semantic annotations, the AR Privacy API uses the labels to guide segment layout without exposing potentially private information to the web page (or associated server or cloud host). As noted above, the semantic annotations can be statically placed; for example, in various embodiments, the AR Privacy API uses the semantic annotations to add "vertical" or "horizontal" annotations to various surfaces to reflect the orientation of particular surfaces in the room or space. Annotations can also be dynamic, such as tracking an object's position as it moves around the room, tracking the user's location, reading QR codes that encode annotation information, etc.

In combination with the AR Privacy API, a web page or web room can place a segment of content relative to a semantic annotation without knowing if the annotation exists or its location, thus preventing disclosure of potentially private information. In particular, the web page or web room uses a string (or other data element) to identify a semantic annotation, and then specifies how it wants the segment to appear relative to that annotation. Further, a segment can be placed relative to multiple annotations. In such cases, a constraint solver component of the AR Privacy API is used to determine where the segment is to be placed in the room, and does not report the result back to the web page or web room. In other words, the constraint solver is used to determine the position of segments that web sites place near semantically annotated items in the room without leaking the presence or location of the semantically annotated item to the web page.

Advantageously, in various embodiments, annotations can map to multiple locations in the room or space. For example, a 'chair' annotation could annotate every chair in the room. The constraint solver makes no distinction between these annotations, and, given multiple possible annotations, will place segments nearest the annotation instance that most fully satisfies constraints specified by the web page. In general, the constraint solver is used to determine the position of segments that web sites place near semantically annotated items in the room without leaking the presence or location of the semantically annotated item to the web page.

The semantic annotation component of the AR Privacy API also allows segments to place themselves relative to other segments, as it exposes each segment's rendering location as a semantic annotation. With these annotations in place, it is possible for a web page to rely on the semantic annotation system for all of its layout needs, without having to attach segments to particular "screens." While it is possible for the AR Privacy API to use completely constraint-specified layouts, it is generally simpler to use semantic annotation in conjunction with the aforementioned screen abstractions.

In various embodiments, the AR Privacy API is permitted to reveal the location of select semantic annotations directly to the web page to give the web site greater control over how it displays content in the room or space. This is particularly useful when an annotation maps to multiple locations. For each such annotation, the web site has access to its location in 3D space, and can determine when or if the annotation makes contact with particular "screens" in the room. However, the precise location and contact information is still privileged such that potentially private information is not exposed. Note that section 2.4 provides a discussion of how events related to semantic annotations are exposed in a web developer-friendly manner while still protecting user privacy.

2.3 Input Abstractions:

The AR Privacy API provides a comprehensive framework of input events that naturally complement the rendering abstractions described in Section 2.2 while remaining operable with existing events on conventional web pages. The AR Privacy API supports a wide range of input events, and can be easily adapted to include any desired type of input in view of the discussion provided herein. In various embodiments, these input events are categorized into three event types, including: 1) screen-local events; 2) global events, and 3) legacy input events (also referred to as legacy emulation) to maintain backward compatibility with the current web. Each of these event types are discussed in further detail below.

2.3.1 Screen-Local Events:

A screen-local event is defined as an event that occurs on a particular "screen." These come in two forms: precise screen-local events and imprecise screen-local events.

A precise screen-local event occurs at a particular (x,y) coordinate on the "screen." Similar to mouse events on conventional web pages, screen-local events translate into events on individual web-page elements that may "capture" down to and "bubble" up from the target element in the DOM tree. In various embodiments, precise screen-local events are implemented as codes in a way that they will be most general. For example, a precise screen-local position event may be initiated following touching a tablet display, or touching a wall, or from a laser pointer on a toy gun. The server does not know the nature of the "screen," or the event that generated that position, unless it is specifically asked for.

Advantageously, the principle of sending back as little information as possible to web sites or servers leads to the definition of more capabilities of the browser. For example, suppose that the display on the "screen" is intended to always face the user. In this case, instead of sending the direction of the user to the server, the server can instead supply enough information to enable rendering to different directions (such as 3D model, panorama, and multiple views), with the AR Privacy API and the browser then choosing to render the "screen" in the right direction.

An imprecise screen-local event occurs on the "screen." However, imprecise screen-local events are not precise enough to specify where on the "screen" it takes place. This allows the web developer to add event listeners to the segment attached to the "screen" to capture these events. Further, in contrast to precise screen-local events, imprecise screen-local events do not "bubble" as there is no clear root element that the action is targeted to.

In general, each "screen" describes the set of input events that it supports through its capabilities property. Note that the capabilities property is one of the four "screen" properties discussed above in Section 2.2.2. Each item in the capabilities set is a string or data element corresponding to the screen-local event name, which can be used in the JavaScript API (or in any other scripting or coding language-based API) to assign event listeners to events.

2.3.2 Global Events:

Some types of input events are not clearly targeted at any particular "screen" or location in the room or space. Similar input events exist on conventional web pages. For example, on many mobile devices, a web site can register an event handler in response to orientation changes (e.g., change layout and/or content of displayed web page when device shifts from a portrait to landscape orientation). Global input events in the AR Privacy API framework work in the same way. However, it should be understood that global input events include a broad set of events (e.g., gestures, voice commands, sensor data, etc.) that are not limited to device orientation changes.

A number of input devices map naturally to global input events. For example, if a person is making gestures at a depth camera, it is not clear what the target of these gestures are without additional information that may not be available, such as gaze. When such information is available, the AR Privacy API provides the capability to combine these events into a new screen-local event.

2.3.3 Legacy Input Events (Legacy Emulation):

Conventional web sites generally depend on having a keyboard and mouse (or corresponding input modalities) present for navigation and input. While many touch devices do not have either, they simulate these input types using touch events and on-screen keyboards. However, many AR input devices are not precise enough to simulate pixel-perfect mouse movements over large regions. For example, the Kinect® depth sensor currently offers a resolution of 640×480. Keyboard inputs could be simulated using speech recognition, but this is not suitable for all forms of text entry.

In various embodiments, the AR Privacy API provides a middle ground type solution. In particular, in various embodiments, the AR Privacy API supports mouse and keyboard events on those "screens" that provide screen-local inputs that are suitable for simulating mouse and keyboard events. For example, a touch display could emulate mouse and keyboard events in a conventional manner. Similarly, a system with accurate gaze-tracking could simulate the mouse and keyboard with a combination of gazing for targeting and gestures for actions. Other examples of this concept include, but are not limited to, using laser pointer to mark a point on a screen, hand pointing, or putting a physical object on a screen. As a result, the keyboard and mouse (and corresponding input modalities) are treated as screen-local events, as discussed in Section 2.3.1.

In order to provide compatibility with existing web pages and techniques, the AR Privacy API setup includes at least one "screen" that supports mouse and keyboard events.

However, it should be understood that given the increasing resolution and capabilities of various AR devices, many or all such devices will be capable of emulating pointing-style input with enough precision to provide mouse emulation for all "screens" in a room. For example, given sufficient resolution, it is possible to emulate dynamic mouse or pointer inputs by tracking a user's finger (or gaze) with sufficient resolution and frequency to determine where on a particular "screen" the user is pointing (or looking) from across the room.

2.4 Adaptation to the Web Environment:

In general, conventional web sites are architected around three central technologies, including: 1) HTML (or other scripting language) for describing the layout and structure of content; 2) CSS for describing the style of content; and 3) JavaScript (or other executable coding language) for describing interactions. The AR Privacy API provides a superset of existing browser functionality in these technologies for describing web room layouts, styles, and interactions, and for allowing existing web pages or sites to be rendered in the 3D space of the user's room. Again, it should be understood that the AR Privacy API is not intended to be limited to use with HTML, CSS, JavaScript, or any other particular script or language and that the discussion provided herein of such scripts and languages is presented for purposes of explanation.

2.4.1 Exemplary HTML Adaptations:

In various embodiments, the rendering abstractions of the AR Privacy API use cohesive rectangles (or any other shape) of content called segments, as discussed above in Section 2.2 of this document. Conventional HTML is augmented by adding a segment container tag to HTML (i.e., "<segment></segment>"). The segment container tag is used to annotate arbitrary HTML content as a segment. For example, the segment container tag would be used, for example, to annotate content such as the text string "Hello World" by using HTML scripting language such as "<segment>Hello World</segment>".

Note that the content of a segment container tag is not limited to text. In other words, any content that can be placed in any conventional HTML container (e.g., a "<div></div>" container) can also be placed into a segment container tag. Further, the concept embodied in the segment container tag can be implemented using terms for delimiting these tags other than "segment" (e.g., "sector," "portion," etc.) so long as the AR Privacy API is coded to understand that the term being used is a separate container that is intended to represent a cohesive section of content that is to be handled in the manner of the segments described herein. Further, by using style sheets or the like, such as CSS, the segment tag can also specify various size-related properties that other container tags support, such as, for example, min-width, min-height, width, and height. In various embodiments, other than the size properties, segment tags do not influence the 2D layout of the content contained within them. However, additional properties may be associated with segment tags, if desired, to address particular content layout issues.

Segment tags differ from other HTML tags in various ways. First, they are not visible in the room or space unless the web page specifies a target "screen" or annotation constraint for them using CSS (see Section 2.4.2), JavaScript (see Section 2.4.3), or other web coding language.

Further, nesting segment tags, such as for example:

```
"<segment>
    Hello World
    <segment>
        Goodbye World
    </segment>
</segment>
``` can be used to display content in multiple places in the room at once. Note that this may cause additional complications for legacy web sites since legacy mouse input events and the like assume that content is rendered on a single display device. Therefore, existing web sites will not distinguish between mouse events or the like originating from one room location over another in the case of nested segment container tags. Consequently, in such cases, the AR Privacy API optionally acts as an intermediary to intercept and report particular input events to the legacy web page in a manner that allows legacy web page to handle those input events as if they were received relative to content rendered on a single display device.

2.4.2 Exemplary CSS Adaptations:

Many web sites use Cascading Style Sheets (CSS) to style their web pages. Further, newer versions of the CSS standard specify a wealth of functionality for conditionally styling web pages. For example, CSS media queries allow styles to be applied to content in response to events such as display orientation changes, color change on mouse hover, etc. As discussed in further detail in the following paragraphs, the AR Privacy API builds upon these technologies, and additionally adds various CSS constraint properties for declaratively specifying the layout of segments relative to semantic annotations.

2.4.2.1 Media Queries:

Media queries allow web pages to change the style of content in response to varying environments. For example, media queries allow mobile versions of sites to adjust content in response to orientation changes when the user rotates a cell phone. Media queries also allow the page to respond to height and width changes as the user resizes the browser window.

In general, conventional media queries are structured as follows: @media <media type> and <media expressions>{ . . . }. For example, the following media query is invoked if the "screen" has a 16:9 aspect ratio: @media "screen" and (device-aspect-ratio: 16/9) { . . . }. Since the various "screens" in the user's room or space may have widely varying sizes, shapes, profiles, etc., the AR Privacy API extends the "screen" media type to allow web pages to specify conditional styles for segments to adjust to varying "screen" properties across rooms.

Unfortunately, conventional media queries are global to the entire web page since they assume a single display device. Consequently, the AR Privacy API extends the scope of media queries to individual "screens" or individual segments in the multi-screen and multi-segment AR environment being rendered by the AR Privacy API in the room or space around the user.

Advantageously, in various embodiments, the AR Privacy API uses existing media queries for "screens" by allowing styles to have multiple values depending on the "screen" context. In other words, the AR Privacy API enables the CSS to be evaluated once for each "screen," and to be applied to elements according to the "screen" that those elements are projected on. For segments placed using semantic annotation constraints, the "screen" is the size of the segment. Advantageously, this feature gives the web designer flexibility in adapting content to changing "screen" conditions.

2.4.2.2 Semantic Annotations:

The AR Privacy API adds various CSS properties for segment elements that specify constraints on where particular segments are to appear in the room or space around the user. Examples of such constraints are listed below in Table 1. Each of these exemplary constraint takes a list which can contain a mix of annotation names and instance GUIDs. Annotation names identify a type of annotation (such as chair, table, wall, cat, person, etc.), while instance GUIDs represent an instance of an annotation (such as a particular chair in the room). Instance GUIDs are retrieved through the JavaScript semantic annotations API, discussed below in Section 2.4.3.

TABLE 1

Exemplary AR Privacy API CSS Constraints

| Constraint | Description |
| --- | --- |
| left-of | Place the segment to the left of these annotations. |
| right-of | Place the segment to the right of these annotations. |
| above | Place the segment above these annotations. |
| below | Place the segment below these annotations. |
| valign | Vertically align the segment with these annotations relative to the plane perpendicular to the ground. |
| halign | Horizontally align the segment with these annotations relative to the ground |

Note that these exemplary CSS constraints are applicable to segment elements. Each constraint takes a list of annotation names and annotation instance GUIDs. Further, note that the names used to describe these constraints have no particular significance but are intended to be generally descriptive of the functions related to those constraints.

2.4.2.3 Other Possible Uses:

Clearly, there are a wide variety of possible uses and applications of CSS in the environment enabled by the AR Privacy API. Only a few such examples are discussed herein, and it should be understood that the examples described herein are not intended to limit how the AR Privacy API is to be used with various CSS capabilities. For example, CSS animations allow web designers to use GPU-accelerated animations without needing to do any GPU programming. In various embodiments, the AR Privacy API is adapted to use CSS3-based animation techniques (e.g., 3D CSS animations), allowing web pages to specify animations without using any room information. The browser renderer then interfaces with the AR Privacy API to determine how to execute the animation using what it knows about the room. Further, in various embodiments, the AR Privacy API also makes use of CSS3-based techniques that allow 2D styles to be rendered in 3D using various perspective techniques (e.g., projecting onto a skewed panel, or skewing content projected onto a non-skewed panel).

2.4.3 Exemplary JavaScript Adaptations:

Most conventional browsers expose comprehensive functionality through JavaScript for dynamically responding to events and altering page structure, content, and style. As is well known to those skilled in the art of web page coding and construction, it is possible to construct an entire web page or web site on-the-fly using JavaScript and standard browser APIs to inject HTML and CSS into the page. In various embodiments, the AR Privacy API enables these capabilities in the context of immersive AR experiences by exposing some or all of the functionality described herein through JavaScript (or other web coding or scripting languages).

As is well known to those skilled in the art of web page coding and construction, many web browsers expose a standardized method for subscribing to events in the web browser called "add EventListener." This method is typically called on the web page element that is the target of the event, and passes it a string (or data element) to uniquely identify the event being subscribed to along with a callback function that the browser invokes when the event fires.

In various embodiments, the AR Privacy API augments the set of existing events with new events for its rendering abstractions and sensor input. Like existing events on the web, these events vary in whether or not they "capture" down to and "bubble" up from their targets in the Document Object Model (DOM) tree, which is commonly referred to as "bubbling". As described in Section 2.3.1, various precise screen-local events support bubbling.

Note that Table 2, below, illustrates an exemplary set of legacy events, some or which support bubbling, and some of which do not. The legacy event descriptions in Table 2 are derived from the well-known Mozilla Developer Network. In addition, Table 2 also provides examples of several new events added to the set of legacy events for use in implementing various embodiments of the AR Privacy API. Note that the names used to describe the various new events illustrated in Table 2 have no particular significance, but are intended to be generally descriptive of the functions related to those events. Note that the AR Privacy API either directly supports or emulates the legacy events in addition to supporting the various newly added events. Note that various examples of new global events are provided below in Table 3, with the names used to describe these events having no particular significance other than to be generally descriptive of the functions related to those global events. Note also that the some or all of the newly added events in both Table 2 and Table 3 provide potentially sensitive information. Consequently, in various embodiments, the AR Privacy API either allows or denies elevated privileges (depending upon automatic or user specified privacy settings) for web pages to access those new events.

TABLE 2

Precise Screen-Local Events

| Event | Description |
| --- | --- |
| | Events with Bubbling: |
| mouseout | Legacy event: a pointing device is moved off the element that has the listener attached or off one of its children. |
| mouseover | Legacy event: a pointing device is moved onto the element that has the listener attached or onto one of its children. |
| mousemove | Legacy event: a pointing device is moved over an element. |
| mousedown | Legacy event: a pointing device button (usually a mouse) is pressed on an element. |
| mouseup | Legacy event: a pointing device button is released over an element. |
| click | Legacy event: a pointing device button has been pressed and released on an element. |
| keydown | Legacy event: a key is pressed down. |
| keyup | Legacy event: a key is released. |
| keypress | Legacy event: a key is pressed down and that key normally produces a character value. |
| input | Legacy event: the value of an element changes or the content of an element with the attribute contenteditable is modified. |
| itemmove | New event: a semantically annotated item has shifted its position on the DOM element or one of its children. May provide sensitive info. |
| itementer | New event: a semantically annotated item has made contact with the element with a particular force of impact (if applicable and if weight is known). May provide sensitive info. |

TABLE 2-continued

Precise Screen-Local Events

| Event | Description |
| --- | --- |
| itemleave | New event: a semantically annotated item has stopped making contact with this particular element. May provide sensitive info. |
| | Events without Bubbling: |
| mouseenter | Legacy event: a pointing device is moved onto the element that has the listener attached. |
| mouseleave | Legacy event: a pointing device is moved off the element that has the listener attached. |

TABLE 3

Global Events

| Event | Description |
| --- | --- |
| screenenter | New event: a new "screen" has entered the room or space. May provide sensitive info. |
| screenleave | New event: a "screen" has left the room or space. May provide ensitive info. |

2.4.3.1 Screens:

In various embodiments, "screens" are a global property of the current room or space in which the AR experience is being rendered. In various embodiments, this global property is read-only, though this is not required. Various exemplary properties of the "screen" component of the AR Privacy API (referred to herein as a "screen API") are provided by Table 4. For example, an array of all "screens" is provided via the getAll( )property (e.g., "screen.getAll( )"). The properties of each "screen" can be used to determine how to place content among them. Note that the names used to describe the various properties illustrated in Table 4 have no particular significance other than to be generally descriptive of the functions related to those properties.

In general, events involving "screens" are either global (see Table 3), or are revealed to the web page through the segments attached to them (see Table 5). Note that the names used to describe the various properties and events illustrated in Table 5 have no particular significance other than to be generally descriptive of the functions related to those properties and events. Note also that additional properties may be added to the screen API, if desired, to address particular layout or rendering issues. Some or all of these properties may provide potentially sensitive information. Consequently, the AR Privacy API either allows or denies elevated privileges (depending upon automatic or user privacy settings) for web pages to access those properties.

TABLE 4

Properties of the Screen API

| Property | Description |
| --- | --- |
| getAll( ) | (Static) Returns an array of all of the "screens" in the room. May provide sensitive info. |
| height | Height of the "screen" in pixels. May provide sensitive info. |
| width | Width of the "screen" in pixels. May provide sensitive info. |
| capabilities | List of screen-local capabilities as an array of strings. May provide sensitive info. |

TABLE 4-continued

Properties of the Screen API

| Property | Description |
| --- | --- |
| location | Location and/or orientation of the "screen" in the room as an object literal with x, y, and z fields, and optional rotation or skew relative to any of the x, y, and z axes. May provide sensitive info. |

2.4.3.2 Segments:

Table 5 provides various exemplary imprecise screen-local events and properties for a segment component of the AR Privacy API (referred to herein as a "segment API"). Some of these events may not be available when the segment API uses the semantic annotation component of the AR Privacy API, as they may depend on a particular "screen" capability that is not present on all "screens." As with other properties and events, some or all of these properties and events may provide potentially sensitive information. Consequently, in various embodiments, the AR Privacy API either allows or denies elevated privileges (depending upon automatic or user specified privacy settings) for web pages to access those properties and events.

TABLE 5

The Segment API

| | Description |
| --- | --- |
| Property | |
| screen | The "screen" that this segment is mapped to, if any. |
| inFov | true if the segment is currently in the user's field of vision. May provide sensitive info. |
| locationAnnotation | A semantic annotation object representing this segment's current rendering location in the room. |
| Event | |
| orientationchange | The "screen" that this segment is attached to has changed orientation. |
| resize | The "screen" that this segment is attached to has changed size. |
| userfoventer | The segment is currently in the user's field of view. May provide sensitive info. |
| userfovleave | The segment has left the user's field of vision. May provide sensitive info. |

Given the properties and events provided by the segment API, segments can be dynamically constructed like any other HTML element. For example, script such as "document.createElement("segment")" can be used by the AR Privacy API to create a new <segment> tag, modify its properties, and then insert it into the DOM tree so it becomes "active". Table 5, shown above, summarizes an exemplary implementation of the segment API component of the AR Privacy API. Note that if the segment does not rely on semantic annotations for placement, the web developer can explicitly assign a valid "screen" to its "screen" property before it becomes visible. Note also that the size of the segment and semantic annotation constraints can be specified using the standard JavaScript APIs for manipulating CSS properties.

2.4.3.3 Semantic Annotations:

As noted above, semantic annotations provide web pages with the ability to place content relative to items in the room without knowing the items' locations. The annotation could optionally provide additional information about the annotated object. For example, an annotation corresponding to an action figure may contain a model number and a current pose of the action figure. Note that individual annotation instances could have custom properties; for example, a ball annotation could specify the radius of the ball. Web pages can dynamically use these annotations in constraints by using the name of the annotation or the GUID of the annotation instance in an appropriate CSS constraint using existing JavaScript functions for manipulating CSS. See Section 2.4.2 for additional discussion on CSS constraints.

Table 6 provides an exemplary implementation of a basic semantic annotation component of AR Privacy API (referred to herein as a "semantic annotation API"). As with other properties and events, some or all of these properties and events may provide potentially sensitive information. Consequently, in various embodiments, the AR Privacy API either allows or denies elevated privileges (depending upon automatic or user specified privacy settings) for web pages to access those properties and events. Note that the names used to describe the various properties and events illustrated in Table 6 have no particular significance other than to be generally descriptive of the functions related to those properties and events.

TABLE 6

The Semantic Annotation API.

| | Description |
| --- | --- |
| Property | |
| get(name) | (Static) Returns an object representing the given annotation, whether or not it actually exists. May return an array of annotation objects if the annotation is present in multiple locations. |
| getSupported( ) | (Static) Returns an array of all of the annotations that the browser supports. This list does not indicate the presence of the annotations; it indicates that the annotation would be recognized if present. |
| guid | The 64-bit globally unique identifier of this annotation instance. |
| location | Location of the annotation in the room, if present. May provide sensitive info. |
| Event | |
| locationchange | Fired when the location of the annotation changes. Includes velocity information, if applicable. May provide sensitive info. |

2.5 Privacy and Security Considerations:

As noted above, various properties and events of the new extensions to conventional web page coding enabled by AR Privacy API may provide potentially sensitive information. Consequently, in various embodiments, the AR Privacy API either allows or denies elevated privileges (depending upon automatic or user specified privacy settings) for web pages to access those properties and events. In general, the AR Privacy API supports fine-grained permissions for each web page or web room, and is flexible enough to support multiple approaches to enabling such permissions. Examples include, but are not limited to, the use of manifests for controlling multiple permissions, prompt on first use to allow or deny particular permissions, user-driven access control UI for setting one or more permission states, etc.

The following paragraphs provide a discussion of some of the security and privacy implications of those extensions in view of various privacy concerns introduced by those extensions that are not found in traditional web applications. However, it should be understood that a wide range of additional security and privacy measures may be adapted for use with the AR Privacy API without departing from the scope of the techniques described herein.

The following discussion also provides various techniques, including the aforementioned layer abstraction and a "screen" privacy mode, for addressing various privacy concerns. In addition, the following discussion describes a permissions-based system that unlocks sensitive portions of the API with permission from the user. In general, the principal in this permissions system is a content origin wherein each principal has access to privileged resources defined by structures, objects, faces, etc., recognized through evaluation of raw sensor data, as discussed in the following paragraphs.

2.5.1 Exemplary Privacy Issues:

In general, segments of a web room have no obvious way to visually determine their origin. In traditional web browsers, the URL bar establishes content provenance, showing the user clearly which web site provided the content of the page. In contrast, the AR Privacy API does not generally associate a URL bar with each displayed segment, thus raising the issue of a lack of content provenance. This issue is similar to that faced by "immersive" browsers on phones and tablets, which take up the whole "screen" and lack visible URL bars. However, in contrast to those types of immersive browsers, the segments enabled by the AR Privacy API may be rendered on any visible surface. Conversely, in various embodiments, the URL or source of content being rendered on a "screen" is optionally displayed on that "screen" by the AR Privacy API. Note that this represents an idealized example of the current web for purposes of explanation. A URL contains segments that are originating from different servers, without control of the hosting server.

The lack of content provenance raises a second issue relating to how to display multiple web rooms. Early conventional web browsers leveraged an existing window abstraction to separate web sites into separate windows. More recently, conventional web browsers use tabs to visually delineate content from different sites. While it is possible for the AR Privacy API to allow segments from different web rooms to intermingle in a physical room or space, this could potentially lead to security or privacy issues wherein one web room is able to impersonate segments of another.

The AR Privacy API addresses such issues by adding privileged resources to the Web platform to limit the exposure of information derived from raw sensor data. In particular, as discussed throughout Section 2.4, various events and properties enabled by the AR Privacy API may provide potentially sensitive information. Consequently, rather than exposing the entire API by default directly to web rooms, in various embodiments, the AR Privacy API instead associates a list of one or more permissions granted to each web room (or web page) per API. The trusted renderer component of the AR Privacy API can then dynamically check permissions and either allow or deny access when a web room (or web page) attempts to access a privileged API.

Figure 2:
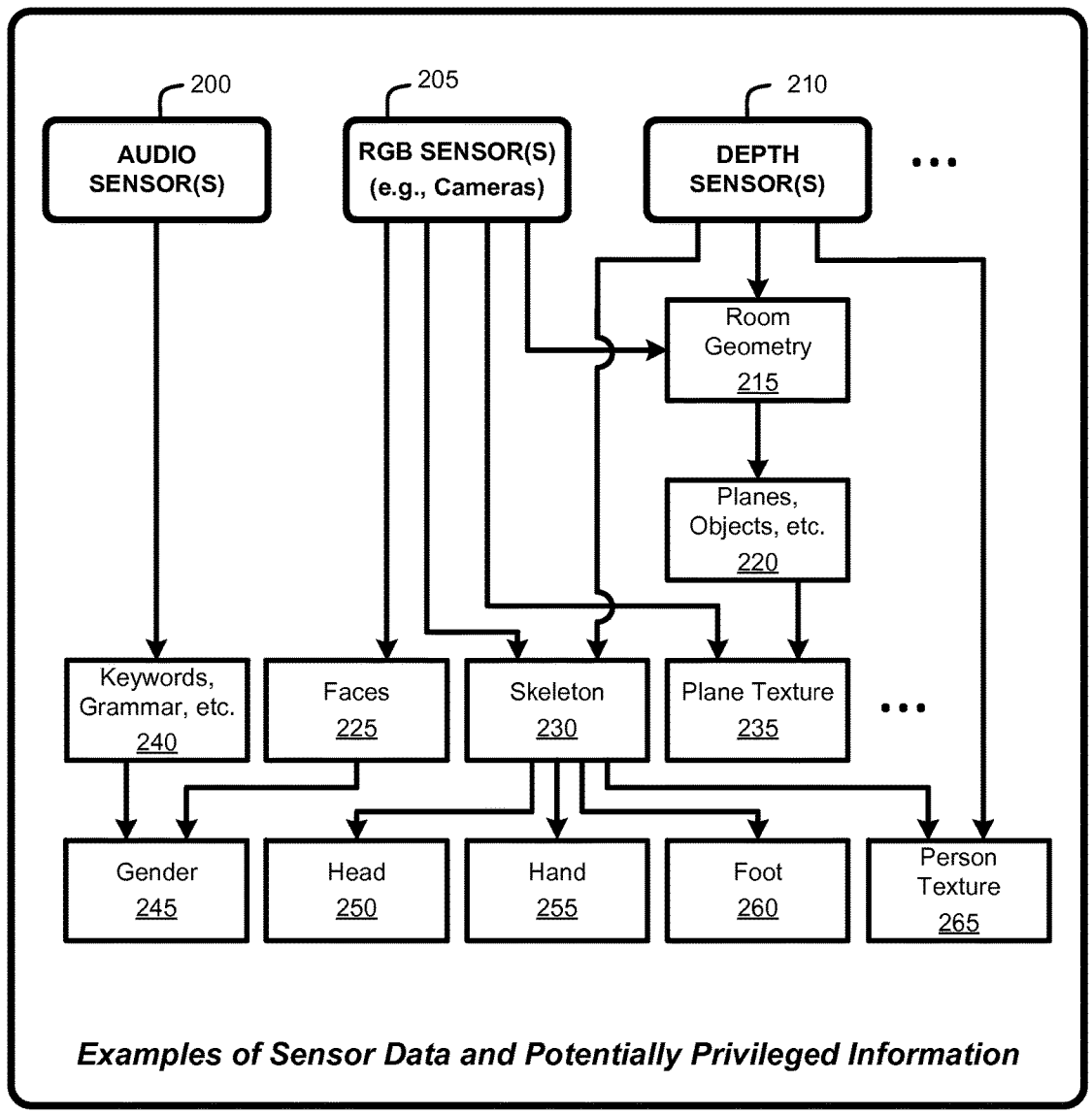
FIG. 2 displays an exemplary illustration of how various sensors are used to derive potentially privileged resources or information relative to the environment in which content is to be rendered by the AR Privacy API, as described herein.

In general, FIG. 2 displays a list of potentially privileged resources generated by an evaluation of raw data derived from various sensors (e.g., by the environmental identification module 100 of FIG. 1). In particular, information typically originates from the three types of sensors: audio sensors 200, RGB sensors 205 (or cameras capable of capturing images in any color space), depth sensors 210, etc. However, it should be understood that other sensor types, e.g., microwave, infrared, pressure, etc., may also be used.

The information is refined into structures for determining the environmental information (e.g., element 150 of FIG. 1) that is used to enable the abstraction of the room or space around the user in a way that allows the AR Privacy API to render content without exposing potentially privileged resources or information to external sites or to sites that are not authorized to receive that information.

Examples of data or information derived or extracted through an evaluation of the various sensors includes, but is not limited to, room geometry 215, planes, objects, etc. (220) in the room or space, keywords, grammar, speech characteristics, etc. (240), faces 225, skeleton outlines 230, plane textures 235. Some or all of this information can then be evaluated in the context of other raw sensor data to extrapolate further information including, but not limited to gender 245 of one or more persons in the room, head position, orientation or tracking information 250 of one or more persons in the room, hand position, orientation or tracking information 255 of one or more persons in the room, foot position, orientation or tracking information 250 of one or more persons in the room, person textures 265 such as clothing, skin color, etc.

2.5.2 Exemplary Privacy Solutions:

To address the issue of content provenance, a trusted user interface (UI) is added to the AR Privacy API. The user can look at the trusted UI to observe the URL (either displayed on user input or gesture or displayed automatically) that is responsible for the current segments, as well as a representation of the segments and their positioning in standard desktop windows. Advantageously, this mechanism allows users to establish ground truth for what is visible and from which server it came.

To address the issue of multiple web rooms, the concept of layers is added to various embodiments of the AR Privacy API. Each layer consists of non-overlapping segments from the same web room. The AR Privacy API either displays all or none of the segments in each individual layer. This allows the AR Privacy API to cleanly separate different web rooms into different rendering units, similar to the way tabs in today's browsers separate different web sites.

In various embodiments, the AR Privacy API displays only one layer at a time on a particular "screen." Showing only one layer establishes a guarantee that all rendered content comes from a single origin. As a result, phishing and clickjacking type exploits become more difficult since content from different origins is not mixed and matched for display on a single "screen." Note that in various embodiments segments may be allowed to fully or partially overlap, and that multiple layers may be displayed, however, this could potentially expose various security issues such as phishing and clickjacking type exploits. Another advantage of the web room is that the multitude of "screens" allow a wide range of configurations for displaying content. For example, in practice, only a few of those "screens" will typically be used for receiving input, e.g., those that are at hand reach of the user, or on physical screens with various input mechanisms, etc., while other screens may be used for displaying other content. One simple example of this type of setup is to provide a main layer input "screen," e.g., a "screen" closest to the user, or in the center of the user's vision, while various other elements or layers of content, which may attempt to masquerade as another input location (e.g., fake download buttons), are rendered on a "screen" farther from the user. As such, rendering each layer of content on a separate "screen" typically makes it less likely that a user will accidently click them, relative to typical one screen solutions for rendering multiple layers.

In various embodiment, privacy and security issues are further addressed by providing HTML iframe permissions with extensions to conventional content security policies (CSP), as discussed below. For example, forcing a single layer at a time prevents web rooms from using traditional web page strategies such as embedding content from other origins. However, the AR Privacy API addresses this issue by allowing web rooms to embed content with the iframe tag. Just as in a standard iframe in a web page, this content is sandboxed with respect to the rest of the web room, but the embedding web room adds attributes to help the trusted renderer place the content in the room or space around the user.

Conventional CSPs declare a set of content restrictions for a web resource, and a mechanism for transmitting the policy from a server to a client where the policy is enforced. The AR Privacy API provides a mechanism to the embedding web room (or web page) to restrict the capabilities of embedded content by adding a new extension to conventional CSP techniques. For example, conventional web pages use a CSP header to specify restrictions on JavaScript evaluation and where resources such as images can be loaded. With the web rooms enabled by the AR Privacy API, the new extensions to the CSP can specify whether or not embedded pages are allowed to access the rendering abstractions of the AR Privacy API. If not, then the embedded page behaves as if it were in a traditional browser and cannot access any of the extended properties or JavaScript methods enabled by the AR Privacy API. All content is rendered within the segment boundaries established by the parent page. Note that in various embodiments, the CSP is further extended to allow embedded content to have fine-grained access to various abstractions of the AR Privacy API.

In addition, in various embodiments, the AR Privacy API prevents leakage of sensitive information by defining an "extended privacy mode" for use with web rooms. This extended privacy mode is similar to the private browsing mode of existing browsers, but in addition it provides abstracted, rather than actual, information to web rooms about the resources available. More specifically, instead of releasing the actual "screens" and relative positions of those "screens" in the room, the extended privacy mode of the AR Privacy API simulates (and reports) one canonical setting, such as, for example, a single 1080p display (or display of any desired resolution) to the web room. The trusted renderer component of the AR Privacy API then maps this simulated display across one or several actual "screens" in the room, as appropriate. Privacy is further protected by preventing web rooms rendered in the extended privacy mode from having access to the privileged APIs (i.e., the various events and properties) discussed in Section 2.4.

2.5.3 Using Permissions to Address Privacy and Security Issues:

As noted above, the AR Privacy API works with environmental information that could potentially expose various types of sensitive information that users will want control over. For example, without the various protections provided by the AR Privacy API, web sites could retrieve information about all of the flat planes in the room, including their dimensions and orientation. Those sites could also retrieve the textures off of the planes, and could query for their locations in 3D space to reconstruct a rough geometry of the room. Similarly, those sites could retrieve detailed information about the physical person of the user, the user's head, etc., relative to the position of the user in the 3D space.

Consequently, in order to prevent the exposure of potentially private information, AR Privacy API uses a permissions-based system to restrict the flow of information in a way that prevents unauthorized disclosure of private or sensitive information. Various examples of some of this data was illustrated with respect to FIG. 2. Some of that data is discussed in the following paragraphs in combination with various permissions associated with the use, locking, or unlocking of that data for use by various web sites. Note that the exemplary permissions described below are not intended to represent an exhaustive of the particular types of permissions associated with particular types of information or environmental data. In other words, the permissions described below are provided as limited examples of the some of the various types of permissions considered when implementing various embodiments of the AR Privacy API.

2.5.3.1 Keyword Grammar Permissions:

Keyword grammars are a list of spoken words that are used as actions in various applications (e.g., a user may speak the term "load Bing" to initiate an instance of the Bing™ search engine). These permissions are granted on a per-keyword basis, so the user will know which keywords a web site will be listening for before granting it the ability to do so. This information is considered to be sensitive because it potentially allows a web site to listen in on what a user says.

2.5.3.2 Plane Permissions:

With plane permissions, a web site can retrieve the dimensions and orientation of each plane in the room, but will not know where they exist in 3D space. This information is considered sensitive since the nature of the planes in the room can reveal what type of room the user is situated in. This information could be used to infer other details about the user, e.g., a user in a room with large planes that has an IP that traces back to Manhattan might be wealthy.

In various embodiments, the AR Privacy API allows web sites to "lock" a segment to a particular plane or "screen" so that it can have absolute control over that surface in the room. This ability evicts other segments that were using that plane.

Finally, web sites having information regarding planes in a room could potentially determine the true size of segments as they are projected in the room (which can differ from actual segment size if it is impossible to fit it on a plane), and whether or not the projector is currently projecting the segment. These two pieces of information alone hint at the room's segment sizes, which explains why they are unlocked with these permissions.

2.5.3.3 Geometry Permissions:

Geometry permissions enable the web page to know more about room geometry, and the location of planes in 3D space. This information is considered to be sensitive because it reveals a partial 3D model of the room's structure, which could be used in conjunction with other information available to the web page to determine the room's location.

These permissions also unlock the ability to determine what plane or "screen" a segment is currently rendered on. The extra segment information is unlocked at this permission level because it can be used to approximate room geometry. For example, if two segments are constrained such that one is supposed to appear below or above another, a web site could query which plane they are on to determine how planes are placed relative to one another.

2.5.3.4 Plane Texture Permissions:

This permission level unlocks information concerning the texture of planes. Web sites can also query for the predominant color of the plane to assist in adapting segment colors to the environment (e.g., display white text on a black surface, or black text on a white surface), and can grab a bitmap of the actual plane texture. This information is considered to be information sensitive because the textures could be unique enough to identify the location of the user, and could contain other forms of information encoded within it (e.g., a whiteboard surface contains secret plans or private pictures or text).

2.5.3.5 Head Frustum Permissions:

With these permissions, a web site can determine where the user's head is in 3D space, and can determine if certain segments are within the user's field of vision. This information is considered to be sensitive because it reveals the user's location in the room and the user's height.

2.5.3.6 Drag and Drop Permissions:

The AR Privacy API allows web sites to explicitly specify which content origins that its "droppable" segments can be dropped on. The web site can be permissive, and allow all content origins with a wildcard (*). But by default, if the web site does not configure these permissions, its droppable segments cannot be dropped on segments from any other web page. In various embodiments, the same permissions system goes in the other direction, such that a web site can explicitly specify which content origins can drop segments on its segments.

Dynamically, a web site can decide what information to send to different content origins through the standard "ondropped" event, which exposes the content origin of the target site. Further, in the other direction, the source of a dropped segment is exposed to the receiving side through the standard ondropped event. This mechanism allows a careful web page with permissive drag and drop permissions to manage interactions with different content origins that it does not control.

2.5.3.7 iframe Permissions:

The AR Privacy API allows web pages to use an iframe to embed another web page from a different content origin. In some cases, a web page may want embedded content to have access to the trusted renderer described herein. In other cases, a web page may want to simply place the embedded content itself, either as a single segment, or as multiple segments by accessing its DOM tree through the standard "window.frames" property.

To address this issue, the AR Privacy API uses "iframe permissions." In general, these permissions allow a web page to grant iframes from particular content origins access to the trusted renderer of the AR Privacy API, but it cannot transfer its privileges to that content origin. Rather, each iframe content origin requests permissions just like its parent page. If the web page fails to grant a content origin access to the trusted renderer of the AR Privacy API, its pages will not see the trusted renderer of the AR Privacy API, and will think that it is displayed in a regular 2D browser.

Figure 5:
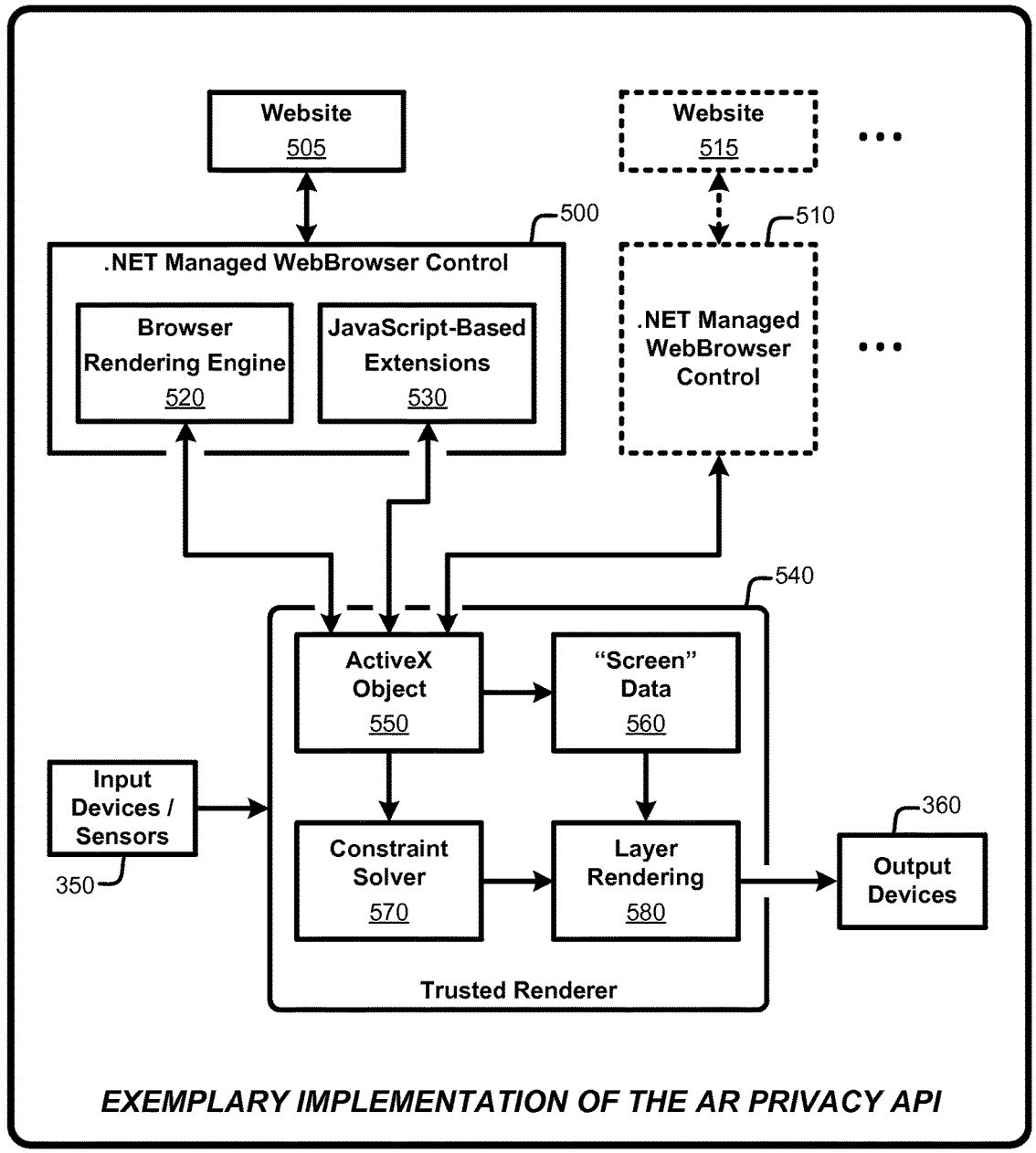
FIG. 5 an exemplary architectural overview of a tested embodiment of the AR Privacy API wherein individual "web rooms" are isolated in separate managed WebBrowser controls, and communicate with a trusted renderer through a JavaScript library that uses various extensions to protect user privacy.

2.5.3.8 Other Permissions:

Examples of other permissions include, but are not limited to:

Hand permissions;
Foot permissions;
Skeleton permissions;
Depth sensor permissions;
Face permissions;
Person texture permissions;

2.5.4 Requesting Permissions:

When interacting with the AR Privacy API, a web site requests permissions when the user first visits the page (unless already granted) through an instantiate function of JavaScript-based extensions to of the AR Privacy API (e.g., see element 530 of FIG. 5). For example, in a tested embodiment of the AR Privacy API, the site passes a "permissions object" that encapsulates the entire set of permissions that the application is requesting. Basically, these permissions can be viewed as "install-time" type permissions such that if a user grants a web page permissions, the web page will keep the permissions across browsing sessions until the user revokes them.

Until the instantiate function has completed, an application will not be able to use the JavaScript-based extensions to of the AR Privacy API. This prevents applications from requesting permissions on-demand. Similarly, in various embodiments, the JavaScript-based extensions to of the AR Privacy API prevents a web site from instantiate more than once. Consequently, if a user fails to give it the permissions it requests, the user will need to explicitly modify those permissions via a permissions configuration menu to alter permissions for the site. Any permissions changed through this mechanism will be exposed to the browser application.

When a user grants permissions, it grants permissions to a content origin. A content origin is the combination of the protocol (e.g., http or https), port, and host. For example, "http://bing.com" and "https://bing.com" are different origins, as are "https://news.bing.com" and "https://bing.com." In various embodiments of the AR Privacy API, these permissions are non-transferable, so a web page cannot transfer elevated access to the JavaScript-based extensions to of the AR Privacy API to scripts and iframes loaded on the page unless it explicitly proxies API requests through existing inter-origin communication means such as by using a window.postMessage event.

2.6 Exemplary AR Privacy API Architecture:

The following paragraphs describe an exemplary overall architecture of the AR Privacy API. It should be understood that the exemplary architecture described herein provides a simple example of some of the many ways in which the AR Privacy API may be implemented and that this example are not intended to limit the scope of the AR Privacy API to the specific example provided.

Figure 3:
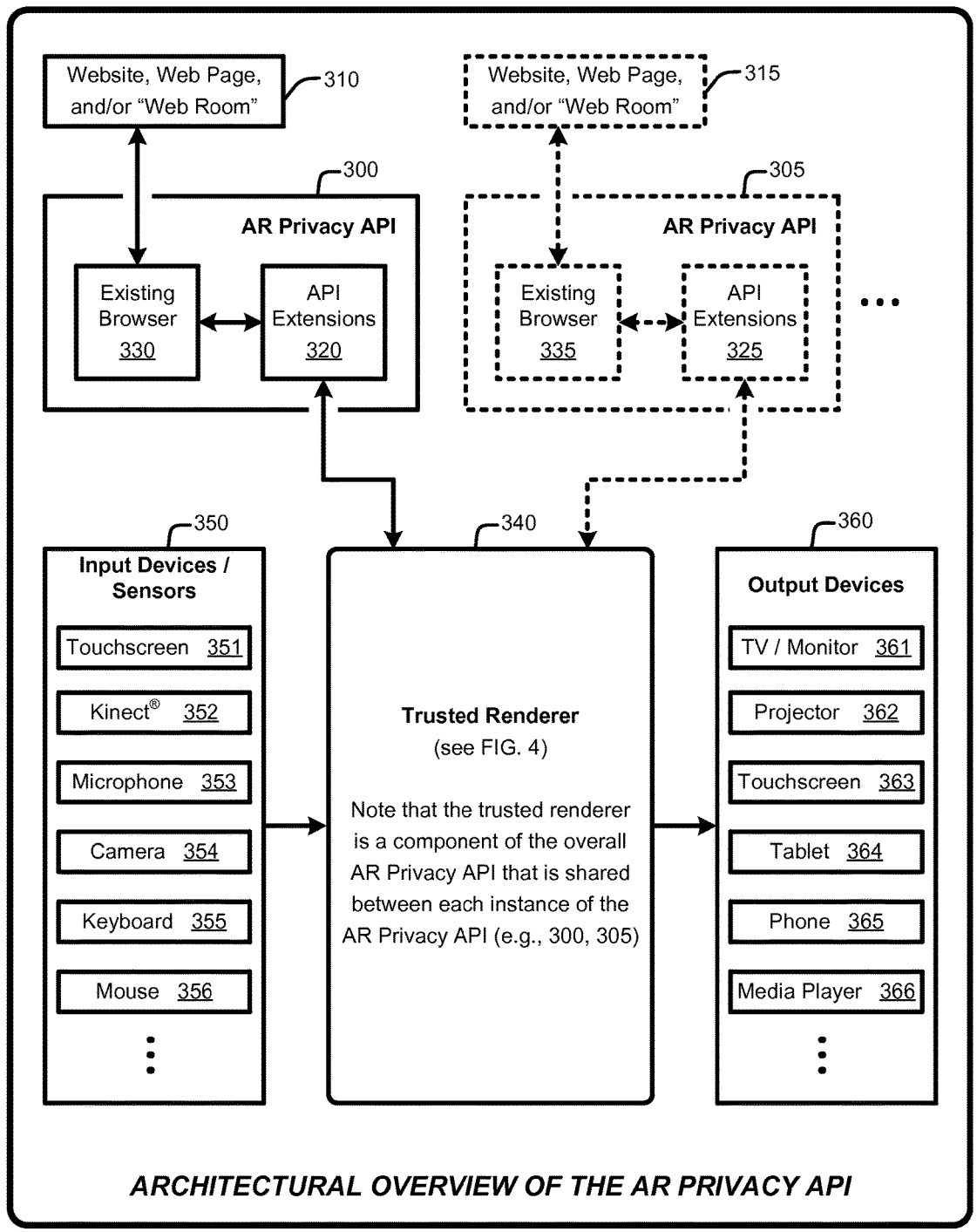
FIG. 3 illustrates an exemplary architectural overview of the AR Privacy API, with a focus on rendering tasks, as described herein.

In order to display a web site or web room in the room or space around the user, the AR Privacy API uses a variety of techniques to detect the "screens" in the room, render segments on some or all of those "screens," and propagate various inputs or events from input devices or sensors to web pages or web rooms that have appropriate permissions to view the input. FIG. 3 provides an overview of the various components of one exemplary implementation of the AR Privacy API, with a focus on the rendering task.

More specifically, FIG. 3 illustrates an exemplary high-level overview of the architecture of various embodiments of the AR Privacy API 300. Note that multiple instances or instantiations of the AR Privacy API (e.g., 300, 305) can run concurrently on one or more computing devices to display the content of different websites, web pages and/or web rooms (310, 315) within the space around the user. Note that for purposes of discussion, the following description of FIG. 3 will refer to a singular instantiation of the AR Privacy API 300.

In general, the AR Privacy API 300 is implemented as either a standalone browser having the functionality described herein, or is implemented by providing a set of API extensions 320 (e.g., extensions implemented using HTML, CSS, JavaScript, etc.) that allow any existing browser 330 to implement the functionality described herein. In various embodiments, these API extensions 320 can be loaded as a plugin or the like either upon browser initialization, or when called by the website, web page and/or web room 310. In either case, the AR Privacy API 300, or the API extensions 320, acts as an intermediary between the website, web page and/or web room 310 by passing content and inputs to and from a trusted rendered 340. The trusted renderer acts to limits the amount of private or sensitive information that it reveals to each website, web page and/or web room 310 through the use of the various semantic annotations, abstractions, permissions, etc., described herein.

The trusted renderer 340 receives content to be rendered from the website, web page and/or web room 310, and then determines upon which "screens" that content is to be rendered. That rendered content is then provided to various output devices 360 for display on the corresponding "screen." Note that the various output devices 360 include, but are not limited to a TV/Monitor 361, projector 362, touchscreen 363, tablet 364, phone 365, media player 366, etc. User interaction with the rendered content is provided by interacting with that content via the trusted renderer using any of a variety of input devices/sensors 350. Examples of if the various input devices/sensors 350 include, but are not limited to, touchscreen 351, Kinect® 352, microphone 353, camera 354, keyboard 355, mouse 356, etc. Note that the trusted renderer is described below in further detail with respect to FIG. 4.

2.6.1 Screen Detection:

As noted above, the AR Privacy API displays content on "screens," including video output devices, such as TVs and monitors, and on arbitrary surfaces or objects in the room using projectors. Note that the concept of "screens" for this purpose is discussed above in Section 2.2. Screen detection involves detecting the presence and physical location of the various types of "screens" available in the room or space around the user.

For example, a first category of "screens" involves movable or dynamic display devices (e.g., tablets, media players, etc.). The locations of these types of physical display devices are dynamically tracked as they move throughout the room or space around the user. Such tracking is accomplished using conventional techniques, such as, for example, by using positional sensors or other hardware or software-based techniques, including, but not limited to, GPS, gyroscopes, RFID tag localization, cameras and depth sensors that scan the room, etc.

A second category of "screens" involves stationary display devices, such as, for example, televisions, monitors, etc. The positions and orientations of these types of stationary devices are determined through various means, such as, for example, an initialization sequence that optically scans for a displayed image in the room (e.g., large number "1" displayed on a first screen, and large number "2" displayed on a second screen). User inputs for specifying positions and orientations of such devices can also be used to define such "screens." Other techniques for locating such devices include, but are not limited to, the use of fixed positional sensors, radio frequency based localization techniques (e.g., RFID, Bluetooth®, etc.), etc. In an example of a tested embodiment of the AR Privacy API, a calibration method was used that presents a set of slides on each "screen." Each of these slides has a pattern of contrasting rectangles (e.g., black and white rectangles) that allows the AR Privacy API to measure the location and orientation of each "screen" (e.g., display, tablet, projection, etc., as well as its extents.

A third category of "screens" are those surfaces (flat, curved, planar, skewed, etc.) or objects in the room or space around the user onto which projections can be made. In various embodiments, the detection of such surfaces and objects occurs as either an offline or online process. Examples of various techniques for identifying such surfaces include automated optical scanning and evaluation techniques for locating suitable surfaces, manual or computer-guided user inputs, etc.

For example, in various embodiments, the offline approach to "screen" detection scans the room once for unoccluded, or partially occluded, surfaces or objects in the room that projectors can reach, and identifies those surfaces or objects as a static set of "screens" onto which the AR Privacy API will allow content to be projected. This approach limits the AR Privacy API to stationary surfaces and objects. Updates to "screens" detected in this manner are accomplished by rescanning the room or space around the user when changes occur.

The online approach is similar to the offline approach, but instead of single scans, the room or space around the user is continuously or periodically scanned for projectable surfaces or objects. This enables the AR Privacy API to track moving surfaces and objects and to accommodate new surfaces and objects as they enter the room or space around the user. Note also that "screen" changes for these projectable surfaces and objects can be communicated to the web page or web room through a JavaScript event or the like. For example, as discussed above with respect to the "global events" in Table 3, events such as the "screenenter" and "screenleave" events are used to communicate when screens enter or leave the room or space around the user.

2.6.2 Semantic Annotation Detection:

In general, semantic annotations can be stationary or moving, and can contain more information than just location. Further, as with many types of input events discussed above, annotations may carry varying levels of sensitive information to which access can be restricted using techniques similar to those discussed herein. Consequently, for purposes of explanation, the following discussion addresses how semantic annotations work in the context of the AR Privacy API without specifically addressing permission-based privacy issues and related concerns.

Semantic annotations can be thought of as "plugins" that can be added to the browser when needed. Such techniques are commonly used with most existing browsers when a particular plugin (e.g., audio, video, etc.) is needed to be downloaded or authorized before the browser can properly render content. This approach allows the AR Privacy API to notify web pages up front which annotation types the browser supports (but not necessarily which ones are active), giving the web page the option to check that the browser meets its requirements.

The properties of an annotation, including its location, can be communicated to the AR Privacy API at any time during runtime. For example, some of these properties could be static locations manually annotated by the user, others could be backed by live object recognizers that track the location of objects, persons, "screens," etc., in the room.

Figure 4:
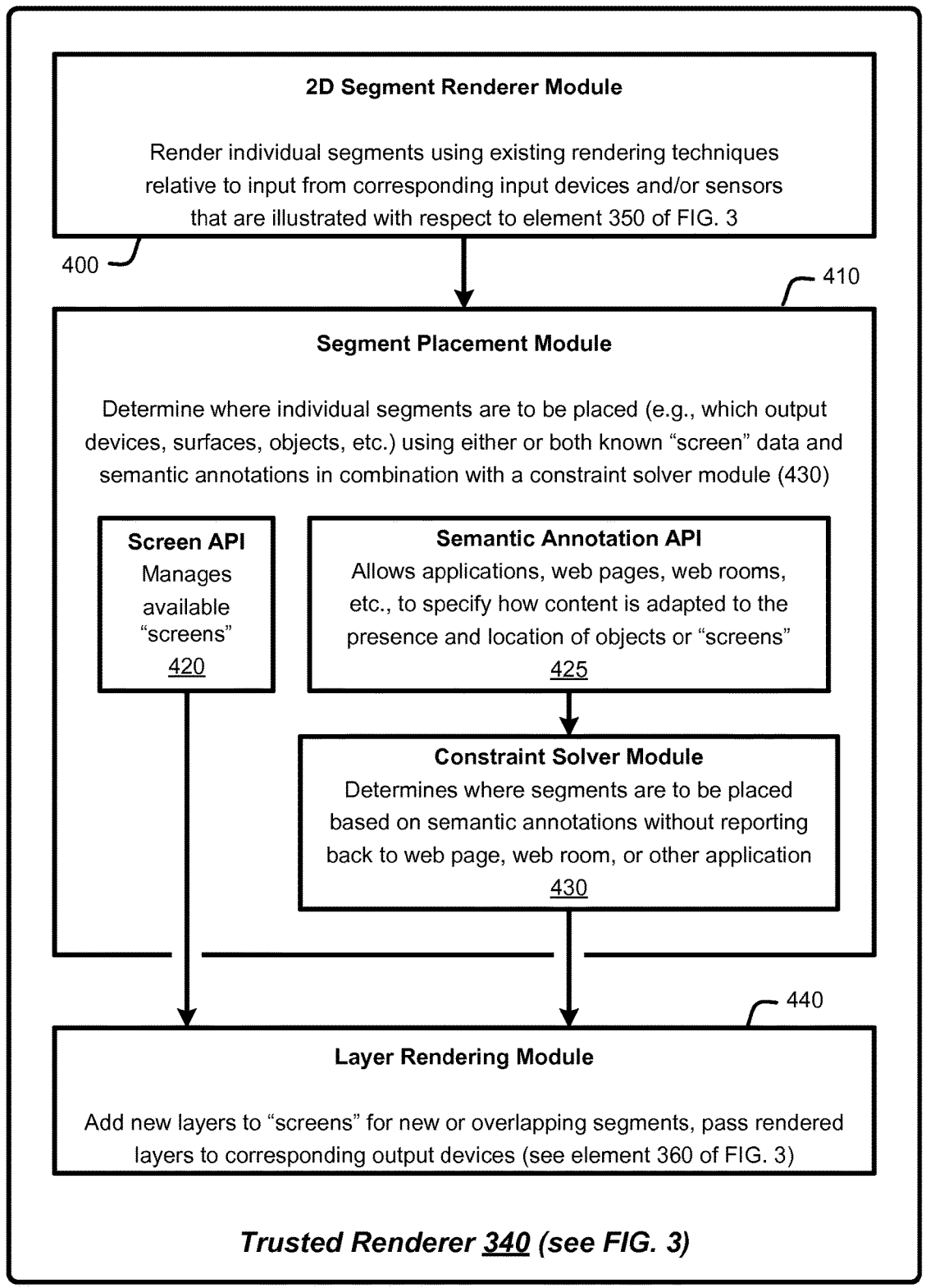
FIG. 4 illustrates an exemplary architectural overview of a trusted renderer component of the AR Privacy API, as described herein.

2.6.3 Content Rendering:

Advantageously, as illustrated with respect to FIG. 3 (discussed above) the architecture of the AR Privacy API's renderer is easily adaptable for operation with conventional web browsers. Similarly, a dedicated browser containing some or all of the functionality of the AR Privacy API can also be implemented in view of the techniques described herein. As noted above, the trusted renderer 340 of FIG. 3 is used to protect user privacy and security while rendering content on the various "screens" and interacting with that content via various input devices. FIG. 4, discussed below, provides additional detail showing an exemplary implementation of the trusted renderer of FIG. 3.

As noted above, the AR Privacy API encapsulates existing browser functionality including, but not limited to, HTML, CSS, and JavaScript functionality, in combination with various additional extensions to such functionality described throughout this document. As noted above with respect to FIG. 3, these extensions (i.e., API extensions 320) communicate with the trusted renderer 340, which, as illustrated by FIG. 4, uses a 2D segment renderer module 400 to render the individual segments that the web page or web room identifies. The 2D segment renderer module 400 uses conventional browser rendering technologies and techniques to render segments.

In addition, although not shown, a 3D segment renderer can use conventional techniques to render segments containing 3D information for display on 3D capable devices. In either case, a segment placement module 410 component of the trusted renderer 340 then combines each rendered segment with information that the web room provides to determine where to place each individual segment (i.e., on which "screen," object, etc.). This placement determination is made using either a screen API 420 component of segment placement module 410 or the semantic annotation API. The screen API 420 identifies a particular "screen" to display the content on, which in turn identifies where the segment is to be rendered.

As discussed above in Section 2.6.1, the available "screens" managed by the screen API 420 are determined via a screen detection process that serves to identify the position and characteristics of various "screens" in the room or space around the user. In contrast, the semantic annotation API 425 compiles down to constraints that are put through a constraint solver module 430, which determines the rendering location of the segment based on the annotations.

All final rendering locations are passed from the segment placement module 410 to a layer rendering module 440 which adds new layers to "screens" for new or overlapping segments. The rendered layers are then passed to the various video output devices for display in the room (e.g., see element 360 of FIG. 3). Note that the actual rendering on the "screen" can be accomplished using any of a multitude of techniques depending upon the devices on which the content is being rendered, including, but not limited to, projectors, display devices, tablets, phones, Heads-Up-Displays (opaque or transparent), smart windows, etc.

2.6.4 Input Processing:

The various API extensions provided by the AR Privacy API can be extended to support a wide range of input devices/sensors (e.g., element 350 of FIG. 3). For example, Section 2.3, describes various classes of events supported by the AR Privacy API. In general, the AR Privacy API ensures that websites, web pages or web rooms have the appropriate permissions before releasing input data to the site.

In various embodiments, the AR Privacy API supports only one active site at a time such that input events are only propagated to the currently active site, though this is not a requirement. Note that multiple active sites can be displayed across the various "screens" at the same time, and that optionally limiting the AR Privacy API to one active site, or to one active site per "screen" helps to prevent various security concerns such as, for example, hidden clickable content from one site displayed as an overlay the content of another site (e.g., clickjacking), cross-scripting security issues, or other various security concerns. In general, the set of input events supported by the AR Privacy API depends on the sensors or input devices connected, but they will fall into the categories of event types discussed in the preceding paragraphs.

2.7 Exemplary AR Privacy API Implementation:

The following paragraphs describe an exemplary description of a tested embodiment of the AR Privacy API designed to operate within the context of an existing browser by implementing the functionality described herein using various JavaScript and ActiveX® elements. It should be understood that the exemplary description of the tested embodiment described herein provides a simple example of some of the many ways in which the AR Privacy API may be implemented and that this example is not intended to limit the scope of the AR Privacy API to the specific examples provided.

Note that the following discussion describes the use of a .NET WebBrowser control for use in implementing the tested embodiment of the AR Privacy API. .NET WebBrowser controls are well-known to those skilled in the art as a software-based tool that provides a managed wrapper for ActiveX® controls. The managed wrapper allows web pages to be displayed in a graphical API included as a part of the .NET framework. Advantageously, WebBrowser controls provide a test platform that allows existing web browser functionality to be duplicated in an application without needing to use or modify the existing browser.

In general, as illustrated by FIG. 5, the aforementioned tested embodiment of the AR Privacy API was implemented via instances of a .NET managed WebBrowser control (500, 510). Each instance of the .NET managed WebBrowser control (500, 510) communicates with a separate website (505, 515) or separate web page that is to be used to provide content for one or more "screens" in the room or space around the user. Each instance of the .NET managed WebBrowser control (500, 510) provides a conventional browser rendering engine 520 in combination with new JavaScript-based extensions 530 for implementing various elements of the functionality described herein. An ActiveX® object 550 implemented in an alternate embodiment of the trusted renderer 540 was used to cross the JavaScript-.NET boundary.

To avoid complex marshaling and demarshaling, this ActiveX® object 550 exposes a simple API with static functions. This allows individual web pages or web rooms to be isolated in separate managed WebBrowser controls, and allows those web pages or web rooms to communicate to the trusted renderer through the JavaScript library provided by the JavaScript-based extensions 530 which serve to implement the functionality of the various AR Privacy API extensions to HTML, CSS, and JavaScript.

The following paragraphs describe how the aforementioned tested embodiment of the AR Privacy API was implemented, and how that tested embodiment handles instantiation, rendering content in the room or space around the user, and briefly addresses how the AR Privacy API processes input events.

2.7.1 Simulating the AR Privacy API:

In various embodiments, existing browser applications (e.g., Internet Explorer®) are adapted to include the functionality described herein with respect to the HTML and CSS extensions described throughout this document. However, in other embodiments, compatibility with various existing browser applications is achieved by simulating the HTML and CSS extensions of the AR Privacy API through a JavaScript library (e.g., the JavaScript-based extensions 530 shown in FIG. 5).

In general, the JavaScript library of the AR Privacy API enables web rooms running in the tested embodiment to use the HTML and JavaScript extensions described throughout this document. Typical browsers allow JavaScript applications to examine the DOM tree, which enables the JavaScript library of the AR Privacy API to find and process segment tags. The JavaScript functionality is easily exposed, as browsers allow scripts to add items to the global scope. The CSS functionality is not exposed through CSS, since the browser does not expose any CSS tags that it does not understand through its JavaScript CSS APIs. Instead, the CSS functionality is exposed as properties of the segment HTML tag.

The JavaScript library of the AR Privacy API converts calls to the AR Privacy API to simpler calls through the aforementioned ActiveX® object. Since web pages are single-threaded GUI applications with an event loop, browsers wait until the event loop is free to process updates to the UI. The JavaScript library of the AR Privacy API simulates this behavior by applying API calls across the ActiveX® boundary in bulk when the event loop is free. Note that since the AR Privacy API can implement the API extensions directly in a browser by simply modifying the source of that browser, the simple ActiveX® API summarized herein is not described in details as it is not of particular relevancy in understanding the concepts described herein.

2.7.2 Instantiation:

Prior to web room navigation, the tested embodiment of the AR Privacy API instantiates an existing constraint solver with "screen" and semantic annotation information that is determined offline. The constraint solver uses this information to determine the physical location of segments that are to be displayed.

In general, web rooms can use declarative rendering for positioning segments. Each segment uses the aforementioned semantic annotation abstraction that may be combined with various rendering constraints, such as, for example, that a particular segment is to be placed on a vertical surface, or that a particular segment is to be placed in line with one or more other segments. The constraint solver evaluates the constraints associated with each segment and derives a solution for placing those segments.

2.7.3 Rendering:

When the user navigates to a web page, the tested embodiment of the AR Privacy API first renders the entire web page in the WebBrowser control. The AR Privacy API then extracts individual PNGs (or any other image format such as JPG, TIF, etc.) for each segment tag using existing methods available on the WebBrowser control.

As illustrated by FIG. 5, the ActiveX® object of the AR Privacy API then groups these segments into two groups: those that use semantic annotations (via the constraint solver 570) for placement, and those that use "screen" data 560 for placement. For the first group (i.e., semantic annotations), the AR Privacy API compiles the annotations to assertions understood by the constraint solver 570, and then invokes the constraint solver to determine where each segment is to be rendered. For the latter group (i.e., "screen" data 560), the AR Privacy API can immediately identify where the content is to be rendered since that content is intended for a particular "screen." In both cases, the rendered segments from both groups are combined during a layer rendering step 580, which determines how many layers are needed to display the content. Finally, the AR Privacy API either displays the rendered content in a 3D virtual room, or in an actual room using the various output devices 360 of the computer or computers running the tested embodiment of the AR Privacy API.

2.7.4 Input Processing:

The tested embodiment of the AR Privacy API provides web rooms with legacy event emulation as discussed above in Section 2.3.

2.8 Optimization of Existing Web Content:

The web contains a wide variety of content that web sites can tailor to different devices. Many web sites already provide a desktop and mobile version, and others are experimenting with tablet layouts. In a similar context, the AR Privacy API allows web sites to provide a layout for its existing content that is automatically optimized for use with the AR Privacy API. This transition would be straightforward for a web page that presents multiple summarizeable pieces of information that are considered "periphery content". For example, the web page can use a user's high resolution or primary display to display primary content, and can summarize other information or content on smaller "screens," or on "screens" positioned throughout the room. Further, the user can use segment-level interactions to bring the content associated with each summarization to her primary display.

4.0 Exemplary Operating Environments

Figure 6:
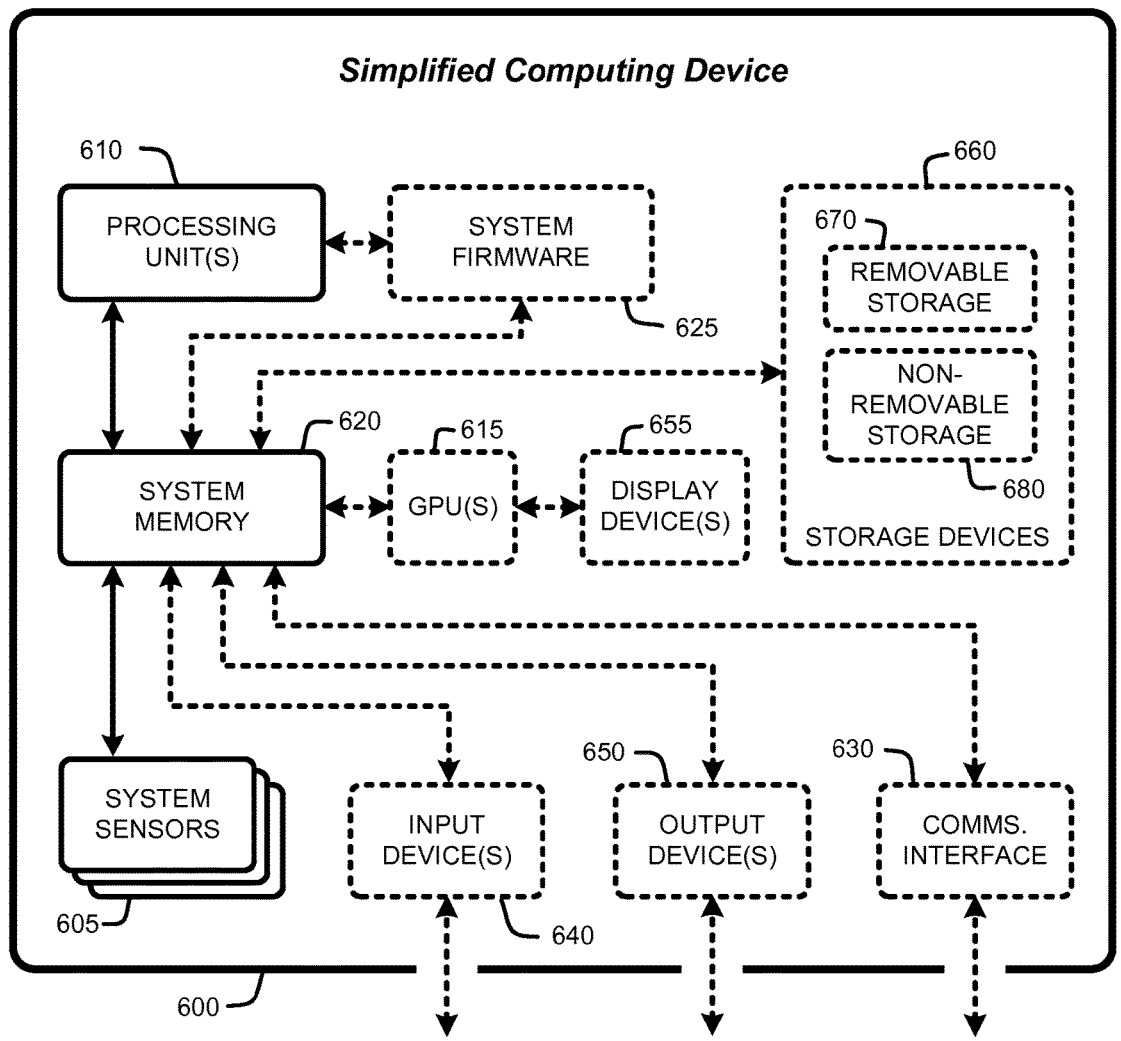
FIG. 6 is a general system diagram depicting a simplified general-purpose computing device having simplified computing and I/O capabilities for use in implementing various embodiments of the AR Privacy API, as described herein.

The AR Privacy API described herein is operational within numerous types of general purpose or special purpose computing system environments or configurations. FIG. 6 illustrates a simplified example of a general-purpose computer system on which various embodiments and elements of the AR Privacy API, as described herein, may be implemented. It should be noted that any boxes that are represented by broken or dashed lines in FIG. 6 represent alternate embodiments of the simplified computing device, and that any or all of these alternate embodiments, as described below, may be used in combination with other alternate embodiments that are described throughout this document.

For example, FIG. 6 shows a general system diagram showing a simplified computing device 600. Examples of such devices operable with the AR Privacy API, include, but are not limited to, portable electronic devices, hand-held computing devices, laptop or mobile computers, communications devices such as cell phones, smartphones and PDA's, multiprocessor systems, microprocessor-based systems, set top boxes, programmable consumer electronics, network PCs, minicomputers, audio or video media players, handheld remote control devices, etc. Note also that as discussed above, the AR Privacy API may be implemented within a carrying case or cover that holds or is otherwise coupled to a wide range of devices or objects.

To allow a device to implement the AR Privacy API, the computing device 600 should have a sufficient computational capability and system memory to enable basic computational operations. In addition, the computing device 600 includes one or more sensors 605, including, but not limited to, accelerometers, cameras, capacitive sensors, proximity sensors, microphones, multi-spectral sensors, etc. Further, the computing device 600 may also include optional system firmware 625 (or other firmware or processor accessible memory or storage) for use in implementing various embodiments of the AR Privacy API. As illustrated by FIG. 6, the computational capability of computing device 600 is generally illustrated by one or more processing unit(s) 610, and may also include one or more GPUs 615, either or both in communication with system memory 620. Note that that the processing unit(s) 610 of the computing device 600 may be a specialized microprocessor, such as a DSP, a VLIW, or other micro-controller, or can be a conventional CPU having one or more processing cores, including specialized GPU-based cores in a multi-core CPU.

In addition, the simplified computing device 600 may also include other components, such as, for example, a communications interface 630. The simplified computing device 600 may also include one or more conventional computer input devices 640 or combinations of such devices (e.g., pointing devices, keyboards, audio input devices, voice or speech-based input and control devices, video input devices, haptic input devices, touch input devices, devices for receiving wired or wireless data transmissions, etc.). The simplified computing device 600 may also include other optional components, such as, for example, one or more conventional computer output devices 650 (e.g., display device(s) 655, audio output devices, video output devices, devices for transmitting wired or wireless data transmissions, etc.). Note that typical communications interfaces 630, input devices 640, output devices 650, and storage devices 660 for general-purpose computers are well known to those skilled in the art, and will not be described in detail herein.

The simplified computing device 600 may also include a variety of computer readable media. Computer readable media can be any available media that can be accessed via storage devices 660 and includes both volatile and nonvolatile media that is either removable 670 and/or non-removable 680, for storage of information such as computer-readable or computer-executable instructions, data structures, program modules, or other data. By way of example, and not limitation, computer readable media may comprise computer storage media and communication media. Computer storage media refers to tangible computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the AR Privacy API described herein, or portions thereof, may be stored, received, transmitted, or read from any desired combination of computer or machine readable media or storage devices and communication media in the form of computer executable instructions or other data structures.

Finally, the AR Privacy API described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

Figure 7:
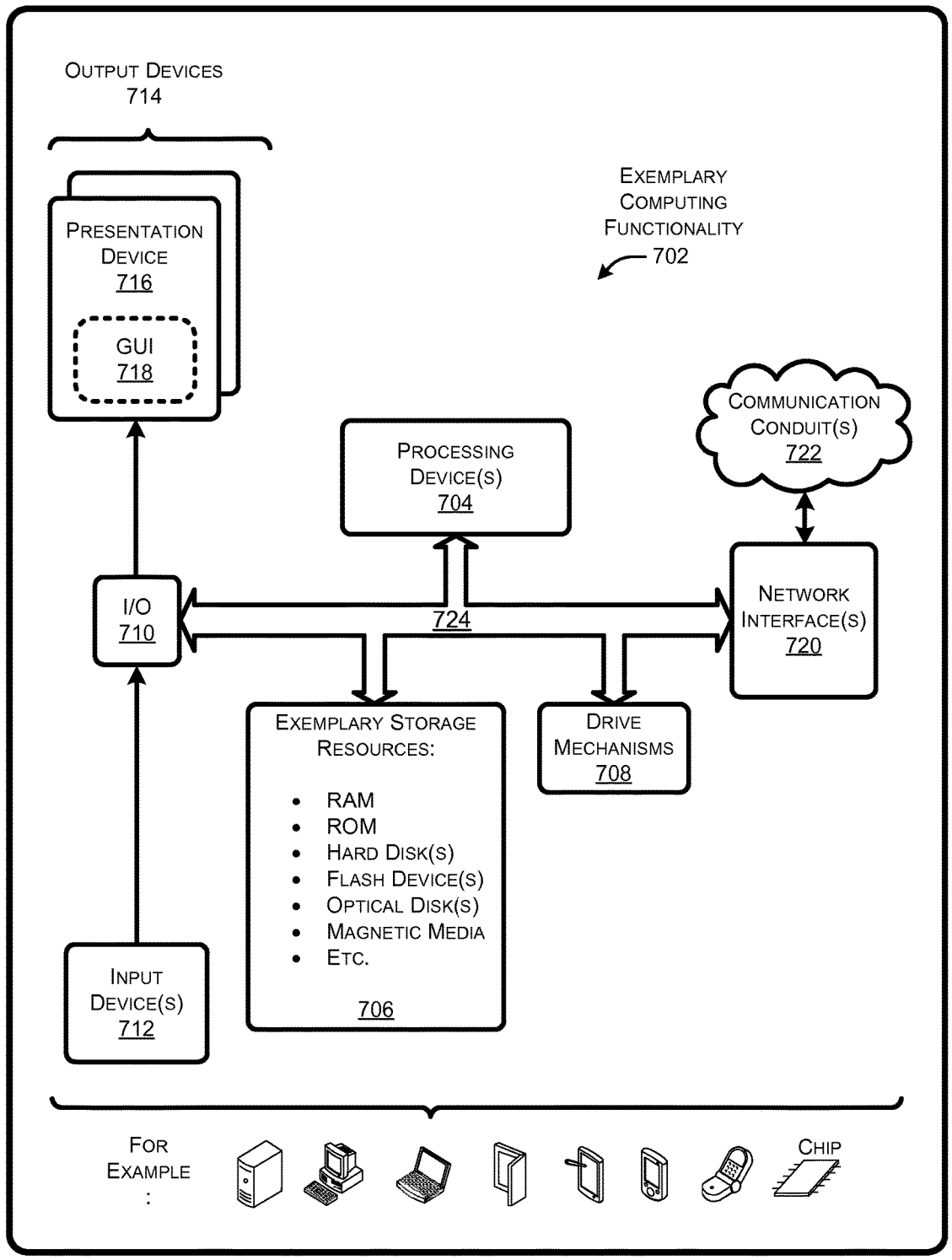
FIG. 7 illustrates exemplary computing functionality that can be used to implement any aspect of the features shown in any combination of the foregoing drawings, and as described throughout the specification.

FIG. 7 shows exemplary computing functionality 702 that can be used to implement any aspect of the AR Privacy API. For instance, the type of computing functionality 702 shown in FIG. 7 can be used to implement the general-purpose computer system of FIG. 6 and/or one or more computer servers or cloud-based computing or storage systems associated with various local and remote capabilities of the AR Privacy API.

The computing functionality 702 can include one or more processing devices 704, such as one or more central processing units (CPUs), and/or one or more graphical processing units (GPUs), and so on.

The computing functionality 702 can also include any storage resources 706 for storing any kind of information, such as code, settings, data, etc. Without limitation, for instance, the storage resources 706 may include any of: RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removal component of the computing functionality 702. The computing functionality 702 may perform any of the functions described above when the processing devices 704 carry out instructions stored in any storage resource or combination of storage resources.

Any of the storage resources 706, or any combination of the storage resources 706, may be regarded as a computer readable medium. In many cases, a computer readable medium represents some form of physical and tangible entity. The term computer readable medium also encompasses propagated signals, e.g., transmitted or received via physical conduit and/or air or other wireless medium, etc.

However, the specific terms "computer readable storage medium" and "computer readable medium device" are specifically defined herein as referring to hardware-based storage devices.

The computing functionality 702 also includes one or more drive mechanisms 708 for interacting with any storage resource, such as a hard disk drive mechanism, an optical disk drive mechanism, and so on.

The computing functionality 702 also includes an input/output module 710 for receiving various inputs (via input devices 712), and for providing various outputs (via output devices 714). Illustrative input devices include a keyboard device, a mouse input device, a touchscreen input device, a digitizing pad, one or more cameras, a voice recognition mechanism, any movement detection mechanisms (e.g., an accelerometer, gyroscope, etc.), and so on. One particular output mechanism may include a presentation device 716 and an associated graphical user interface (GUI) 718. Other output devices include a printer, a model-generating mechanism, a tactile output mechanism, an archival mechanism (for storing output information), and so on. The computing functionality 702 can also include one or more network interfaces 720 for exchanging data with other devices via one or more communication conduits 722. One or more communication buses 724 communicatively couple the above-described components together.

The communication conduit(s) 722 can be implemented in any manner, e.g., by a local area network, a wide area network (e.g., the Internet), point-to-point connections, etc., or any combination thereof. The communication conduit(s) 722 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 702 can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

The foregoing description of the AR Privacy API has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the AR Privacy API. It is intended that the scope of the invention be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented process for using a web browser to render content in a 3D space, comprising:
   using a computer to perform process actions for:
      evaluating data from a plurality of sensors to infer environmental information regarding a space and regarding persons and contents within that space, the environmental information comprising any combination of geometric characteristics of the space and geometric characteristics and positions of contents and persons within the space;
      evaluating the environmental information to identify a plurality of surfaces in the space upon which content can be rendered by one or more output devices;
      labeling one or more of the surfaces with semantic annotations based in part on the environmental information, each semantic annotation comprising one or more physical characteristics and a physical location of a corresponding one of the surfaces;
      receiving content via a networking device from any combination of websites, web pages and web rooms, the content further comprising one or more abstractions that declaratively specify how that content is to be adapted relative to any of a plurality of semantic annotations;
      evaluating the abstractions in combination with the semantic annotations associated with the surfaces to determine one or more corresponding surfaces on which the content is to be rendered; and
      applying the abstractions and corresponding semantic annotations to adapt and render the content onto the corresponding surfaces, via one or more output devices, without disclosing the environmental information to any of the websites, web pages and web rooms.

2. The computer-implemented process of claim 1 further comprising steps for associating a permission state with one or more elements of the environmental information.

3. The computer-implemented process of claim 2 wherein one or more of the permission states are individually granted to particular websites, web pages and web rooms.

4. The computer-implemented process of claim 2 wherein one or more of the permission states are granted to multiple websites, web pages and web rooms.

5. The computer-implemented process of claim 1 wherein the abstractions are interpreted by a trusted renderer that receives content from one or more of the websites, web pages and web rooms and determines which surface that content is to be rendered onto without allowing the websites, web pages and web rooms to obtain information regarding that surface.

6. The computer-implemented process of claim 5 wherein a JavaScript-based API provides an interface between the trusted renderer and each websites, web pages and web rooms.

7. The computer-implemented process of claim 1 wherein a constraint solver is used to evaluate the environmental data to determine the surfaces in the space upon which content is to be rendered.

8. The computer-implemented process of claim 7 wherein the constraint solver evaluates the environmental data and the abstractions of the content relative to the semantic annotations associated with corresponding surfaces to identify which of the surfaces are to be used to render particular content.

9. The computer-implemented process of claim 1 wherein the abstractions further define relative positional relationships between two or more particular segments of the content.

10. A system for rendering content to construct an augmented reality environment, comprising:
   a device for evaluating a plurality of sensors for inferring environmental information regarding a space and regarding persons and contents within that space, the environmental information comprising any combination of geometric characteristics of the space and geometric characteristics and positions of contents and persons within the space;

a device for evaluating the environmental information to identify a plurality of surfaces in the space upon which content can be rendered;

a device for associating one or more semantic annotations with one or more of the surfaces, each semantic annotation comprising one or more physical characteristics and a physical location of a corresponding one of the surfaces;

a networking device for receiving content from one or more websites, web pages and web rooms, the content further comprising one or more abstractions that declaratively specify how the content is to be adapted relative to any of a plurality of semantic annotations;

a device for interpreting the abstractions of the content to associate that content with one or more corresponding surfaces based on the semantic annotations associated with those surfaces; and an output device, comprising any combination of monitors, projectors, touchscreens, tablets, phones, and media players, for rendering the content onto the corresponding surfaces based on the corresponding abstractions and semantic annotations without disclosing corresponding environmental information regarding the surfaces to the websites, web pages or web rooms that were the source of the content.

11. The system of claim 10 further comprising steps for associating a permission state with one or more elements of the environmental information.

12. The system of claim 11 wherein one or more of the permission states are individually granted to particular sources of the content.

13. The system of claim 11 wherein one or more of the permission states are granted to multiple sources of the content.

14. The system 10 wherein a JavaScript-based API provides a trusted interface between the device for rendering content and the source of that content.

15. The system of claim 10 wherein a constraint solver is used to evaluate the environmental data to identify the surfaces relative to any semantic annotations associated with any corresponding surface to associate specific content with one or more corresponding surfaces based on one or more of the abstractions of that content.

16. The system of claim 10 wherein the abstractions further define relative positional relationships between two or more segments of the content.

17. A computer-readable device having computer executable instructions stored therein for rendering content in a 3D space, said instructions causing a computing device to execute a method comprising:

evaluating data from a plurality of sensors to infer environmental information regarding surfaces, objects and persons within a 3D space, the environmental information comprising any combination of geometric characteristics of the space and geometric characteristics and positions of objects and persons within the space;

evaluating the environmental information to identify a plurality of surfaces in the 3D space upon which content can be rendered;

associating one or more semantic annotations with one or more of the surfaces, each semantic annotation comprising one or more physical characteristics and a physical location of a corresponding one of the surfaces;

receiving content from one or more websites, web pages and web rooms via a communications device, the content further comprising one or more abstractions that declaratively specify how the content is to be adapted relative to one or more of a plurality of semantic annotations;

applying a constraint solver to evaluate the environmental data and the semantic annotations associated with any corresponding surface to associate specific content with one or more corresponding surfaces based on the abstractions of that content; and applying one or more output devices for rendering the content onto the corresponding surfaces based on the corresponding abstractions and semantic annotations without disclosing corresponding environmental information to the websites, web pages and web rooms that were the source of the rendered content.

18. The computer-readable device of claim 17 further comprising associating a permission state with one or more elements of the environmental information.

19. The computer-readable device of claim 17 further comprising a JavaScript-based API that provides a trusted interface for rendering content from the source of that content.

20. The computer-readable device of claim 17 wherein the semantic annotations further define relative relationships between two or more of the surfaces.

* * * * *